United States Patent
Seo

(10) Patent No.: US 10,893,158 B2
(45) Date of Patent: Jan. 12, 2021

(54) DISPLAY DEVICE, PROGRAM, AND DISPLAY METHOD OF DISPLAY DEVICE

(71) Applicant: SHARP KABUSHIKI KAISHA, Sakai (JP)

(72) Inventor: Kayoko Seo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/703,113

(22) Filed: Dec. 4, 2019

(65) Prior Publication Data

US 2020/0195788 A1     Jun. 18, 2020

(30) Foreign Application Priority Data

Dec. 13, 2018   (JP) ................................. 2018-233299

(51) Int. Cl.
    *H04N 1/00*         (2006.01)

(52) U.S. Cl.
    CPC ....... *H04N 1/0048* (2013.01); *H04N 1/00411* (2013.01); *H04N 1/00474* (2013.01)

(58) Field of Classification Search
    CPC ............. H04N 1/0048; H04N 1/00411; H04N 1/00474
    USPC ....................................................... 358/1.13
    See application file for complete search history.

(56) References Cited

U.S. PATENT DOCUMENTS

| | | | | |
|---|---|---|---|---|
| 2008/0166137 A1* | 7/2008 | Kanai | ................ | G03G 15/0126 399/12 |
| 2010/0231946 A1* | 9/2010 | Shozaki | ............ | H04N 1/00931 358/1.13 |
| 2011/0235107 A1* | 9/2011 | Sakata | ............... | H04N 1/00416 358/1.15 |
| 2012/0212786 A1* | 8/2012 | Nishiura | ............ | H04N 1/00448 358/3.24 |
| 2012/0274965 A1* | 11/2012 | Yoshida | ............ | H04N 1/00384 358/1.13 |
| 2013/0050734 A1* | 2/2013 | Ito | ...................... | H04N 1/00241 358/1.13 |
| 2017/0324877 A1* | 11/2017 | Tokuchi | ............. | H04N 1/00251 |
| 2018/0275934 A1* | 9/2018 | Takenaka | .............. | G06F 3/1258 |

FOREIGN PATENT DOCUMENTS

JP        2008-304597 A     12/2008

* cited by examiner

*Primary Examiner* — Allen H Nguyen
(74) *Attorney, Agent, or Firm* — ScienBiziP, P.C.

(57) ABSTRACT

To provide a display device including a display that displays an input screen having one or a plurality of areas arranged with an input element, a determiner that determines a cause of a disabled state if the input element is in the disabled state, and a display controller that performs control to identifiably display the one or the plurality of areas arranged with the input element in the disabled state, in a color corresponding to the cause.

5 Claims, 21 Drawing Sheets

FIG. 3

| AREA NAME | INPUT ITEM INFORMATION | | | |
|---|---|---|---|---|
| | INPUT ITEM NAME | INPUT ELEMENT | CHOICES | INPUT VALUE |
| S/MIME SETTING | S/MIME ENCRYPTION | DROP-DOWN LIST | ENABLE, DISABLE | DISABLE |
| DEVICE CERTIFICATE | CERTIFICATE STATE | FILE SELECTION FORM | – | – |
| ELECTRONIC SIGNATURE SETTING | ELECTRONIC SIGNATURE | DROP-DOWN LIST | ALWAYS ENABLE, ASK EVERY TIME, DISABLE | ALWAYS ENABLE |
| ELECTRONIC SIGNATURE SETTING | SIGNATURE ALGORITHM | DROP-DOWN LIST | SHA-1, SHA-2 | SHA-1 |
| ⋮ | ⋮ | ⋮ | ⋮ | ⋮ |
| SORT | SORT | CHECKBOX | – | OFF |
| STAPLING | STAPLING | DROP-DOWN LIST | UPPER LEFT 1 POSITION, LEFT 2 POSITIONS, UPPER 2 POSITIONS, DISABLE | DISABLE |
| BOOKBINDING | BOOKBINDING | DROP-DOWN LIST | SADDLE-STITCH BINDING, HALF-FOLD, DISABLE | DISABLE |
| ⋮ | ⋮ | ⋮ | ⋮ | ⋮ |

FIG. 4

| INPUT ITEM NAME | OBJECT INPUT VALUE | DISABLED INPUT ITEM NAME | STYLE NAME |
|---|---|---|---|
| S/MIME ENCRYPTION | DISABLE | ELECTRONIC SIGNATURE, SIGNATURE ALGORITHM | STYLE 1 |
| STAPLING | UPPER LEFT 1 POSITION, LEFT 2 POSITIONS, UPPER 2 POSITIONS | BOOKBINDING | DEFAULT |
| BOOKBINDING | SADDLE-STITCH BINDING, HALF-FOLD | STAPLING | STYLE 2 |
| ⋮ | ⋮ | ⋮ | ⋮ |

FIG. 5

| STYLE NAME | CORRESPONDING COLOR |
|---|---|
| DEFAULT | GRAY |
| STYLE 1 | PINK |
| STYLE 2 | BLUE |
| STYLE 3 | GREEN |
| STYLE 4 CUSTOM | 0xFFFF00 |
| ⋮ | ⋮ |

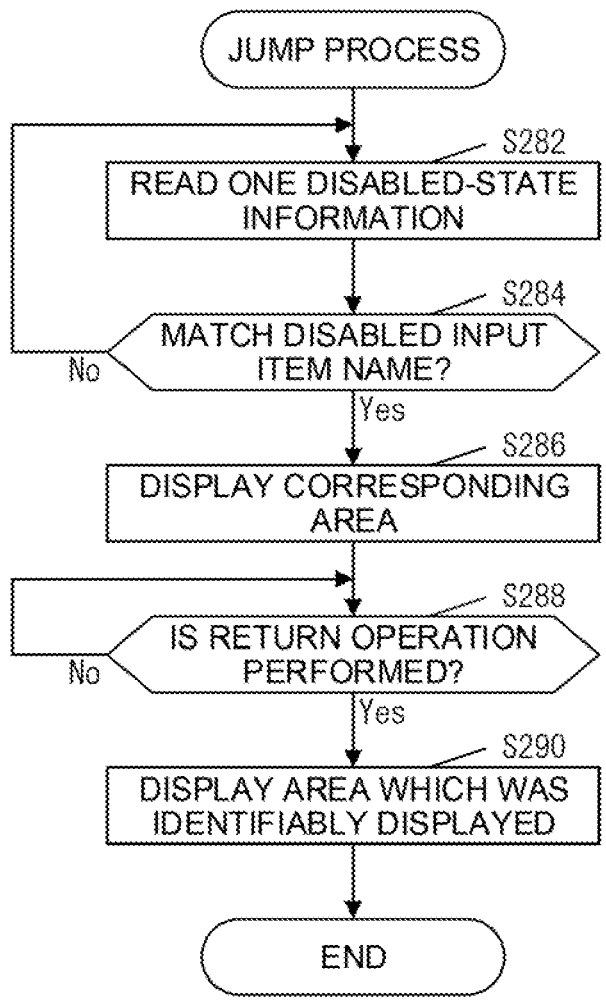

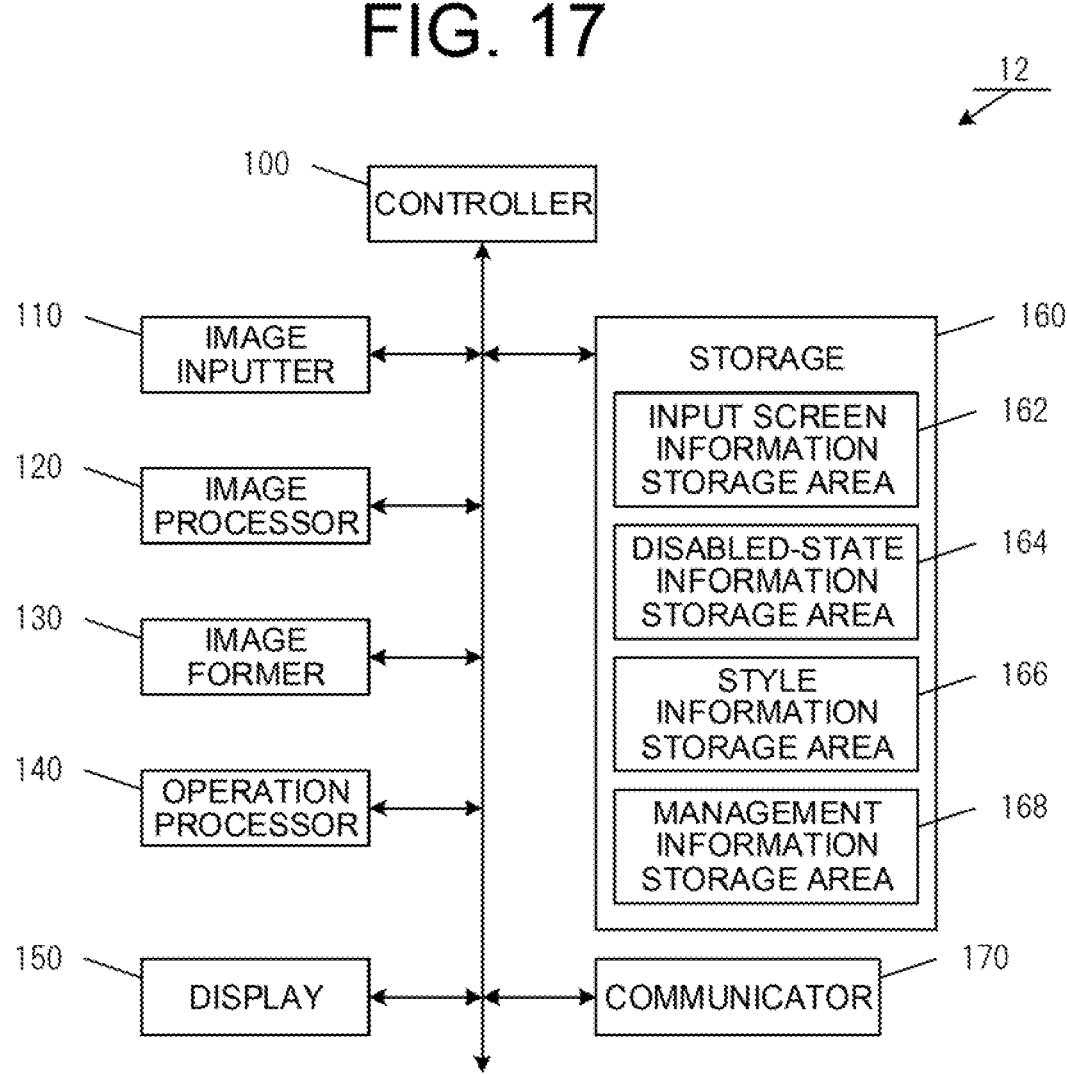

FIG. 18

| REASON FOR DISABLED STATE | DISABLED INPUT ITEM NAME | CORRESPONDING COLOR |
|---|---|---|
| NOT ALLOW CHANGES TO SETTING DUE TO SECURITY SETTING | S/MIME ENCRYPTION | RED |
| SETTING CANNOT BE CHANGED DUE TO DEVICE CONDITION | STAPLING | YELLOW |
| NOT ALLOW CHANGES TO SETTING DUE TO ADMINISTRATIVE REASON | BOOKBINDING | ORANGE |
| ⋮ | ⋮ | ⋮ |

DISPLAY DEVICE, PROGRAM, AND DISPLAY METHOD OF DISPLAY DEVICE

This Nonprovisional application claims priority under 35 U.S.C. § 119(a) on Patent Application No. 2018-233299 filed in Japan on 13 Dec. 2018, the entire contents of which are hereby incorporated by reference.

BACKGROUND OF THE INVENTION

Field of the Invention

The present invention relates to a display device.

Description of the Background Art

Conventionally, an input item for setting an operation of an apparatus such as an image forming apparatus is displayed on a display panel of the apparatus or an input item is displayed on a Web browser to acquire information input by a user. If there is an input item that cannot be changed for some reason, an input element such as a text box, a check box, and a radio button corresponding to the input item is deactivated (disabled) so that the user cannot perform input operations.

Deactivation of an input element is realized by using a grayout function being a standard function of the Web browser, or by displaying the deactivated input element in a uniform color specified in a style sheet. However, in most cases, the user does not know a cause of the deactivation simply by viewing an input screen displayed on the display panel. That is, even if the input element is grayed out by the grayout function, or the deactivated input element is displayed in a uniform color, the user often does not know which item should be changed. Therefore, the user will input various values into the input element arranged on the input screen to change an input value for the input element to activate (enable) the deactivated input element.

To activate a deactivated item, a technique is proposed in which an input item to be changed is clearly indicated to a user. For example, there is proposed a technique in which in a setting screen of a touch panel of an image forming apparatus, a functionally designated key is displayed in a predetermined different color, a key that cannot be used in combination with the functionally designated key is grayed out, an area around the grayed out key is displayed in the same color as the functionally designated key (see, for example, Japanese Unexamined Patent Application Publication No. 2008-304597, hereinafter referred to as "Patent Document 1").

There is also proposed a technique in which in a function on a touch panel of a multifunctional apparatus, if one setting out of settings that cannot be exclusively set is applied, the other setting is grayed out and an "exclusive" button is displayed next to the grayed out input item, and if the "exclusive" button is depressed, an item being a cause of the grayout is selected (see, for example, Japanese Unexamined Patent Application Publication No. 2017-16316, hereinafter, referred to as "Patent Document 2").

However, in Patent Document 1, it is necessary to secure an area around the input item more than required, and thus, this technique is not suitable for expression on a display panel with a limited display area. In addition, in the techniques of Patent Document 1 and Patent Document 2, an item that cannot be exclusively set is displayed in a color, and thus, these techniques cannot be applied to a case where the input element is deactivated due to a cause other than not possible to exclusively set the item.

In view of the above-described problems, it is an object of the present application to provide a display device and the like capable of identifiably displaying an area arranged with an input element according to a cause of a disabled state if the input element is in the disabled state.

SUMMARY OF THE INVENTION

To resolve the above-described problems, a display device of the present invention includes:

a display that displays an input screen having one or a plurality of areas arranged with an input element;

a determiner that determines a cause of a disabled state if the input element is in the disabled state; and a display controller that performs control to identifiably display the one or the plurality of areas arranged with the input element in the disabled state, in a color corresponding to the cause.

In a non-transitory storing medium for storing a program of a display device of the present invention, the program causes a computer to execute:

displaying an input screen having one or a plurality of areas arranged with an input element;

determining a cause of a disabled state if the input element is in the disabled state; and performing display control to identifiably display the one or the plurality of areas arranged with the input element in the disabled state, in a color corresponding to the cause.

A display method of a display device of the present invention includes:

displaying an input screen having one or a plurality of areas arranged with an input element;

determining a cause of a disabled state if the input element is in the disabled state; and performing control to identifiably display the one or the plurality of areas arranged with the input element in the disabled state, in a color corresponding to the cause.

According to the present invention, if an input element is in a disabled state, an area arranged with the input element can be identifiably displayed according to a cause of the disabled state. Accordingly, even if a display screen is narrow, the area can be identifiably displayed without securing a display area for identifiably display the area more than necessary. In addition, since a color to be used to identifiably display the area is differed according to the cause, a user can determine the cause upon confirming the identifiably displayed area.

BRIEF DESCRIPTION OF THE DRAWINGS

FIG. 3 is a table showing an example of a data configuration of input screen information according to the first embodiment;

FIG. 4 is a table showing an example of a data configuration of disabled-state information according to the first embodiment;

FIG. 5 is a table showing an example of a data configuration of style information according to the first embodiment;

FIG. 14 is a flowchart for explaining a jump process according to the second embodiment;

FIG. 17 is a diagram for explaining a functional configuration of an image forming apparatus according to a third embodiment;

FIG. 18 is a table showing an example of a data configuration of management information according to the third embodiment.

DESCRIPTION OF THE PREFERRED EMBODIMENTS

Now an embodiment of the present invention will be described with reference to the drawings. It is noted that an image forming apparatus in the present embodiment is, for example, a digital multifunctional apparatus having a copy function, a facsimile function, a scanner function, and the like, but can also be applied to a printing apparatus or the like, such as a printer.

1. First Embodiment 1.1 Functional Configuration

Figure 1:
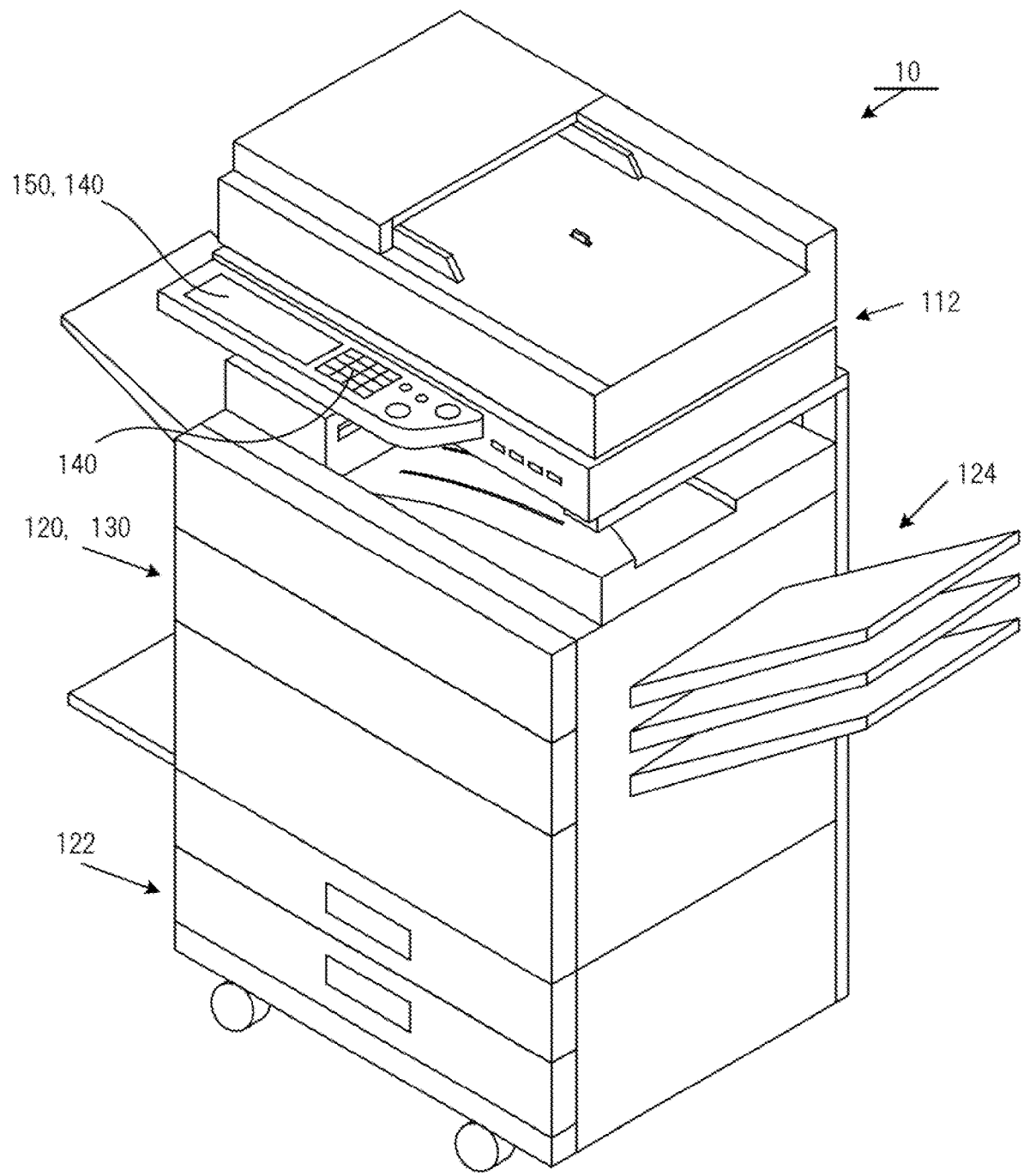
FIG. 1 is an external perspective view of an image forming apparatus according to a first embodiment.

A functional configuration of an image forming apparatus 10 according to the present embodiment will be described with reference to FIG. 1 and FIG. 2. FIG. 1 is an external perspective view of the image forming apparatus 10, and FIG. 2 is a diagram of a functional configuration of the image forming apparatus 10.

Figure 2:
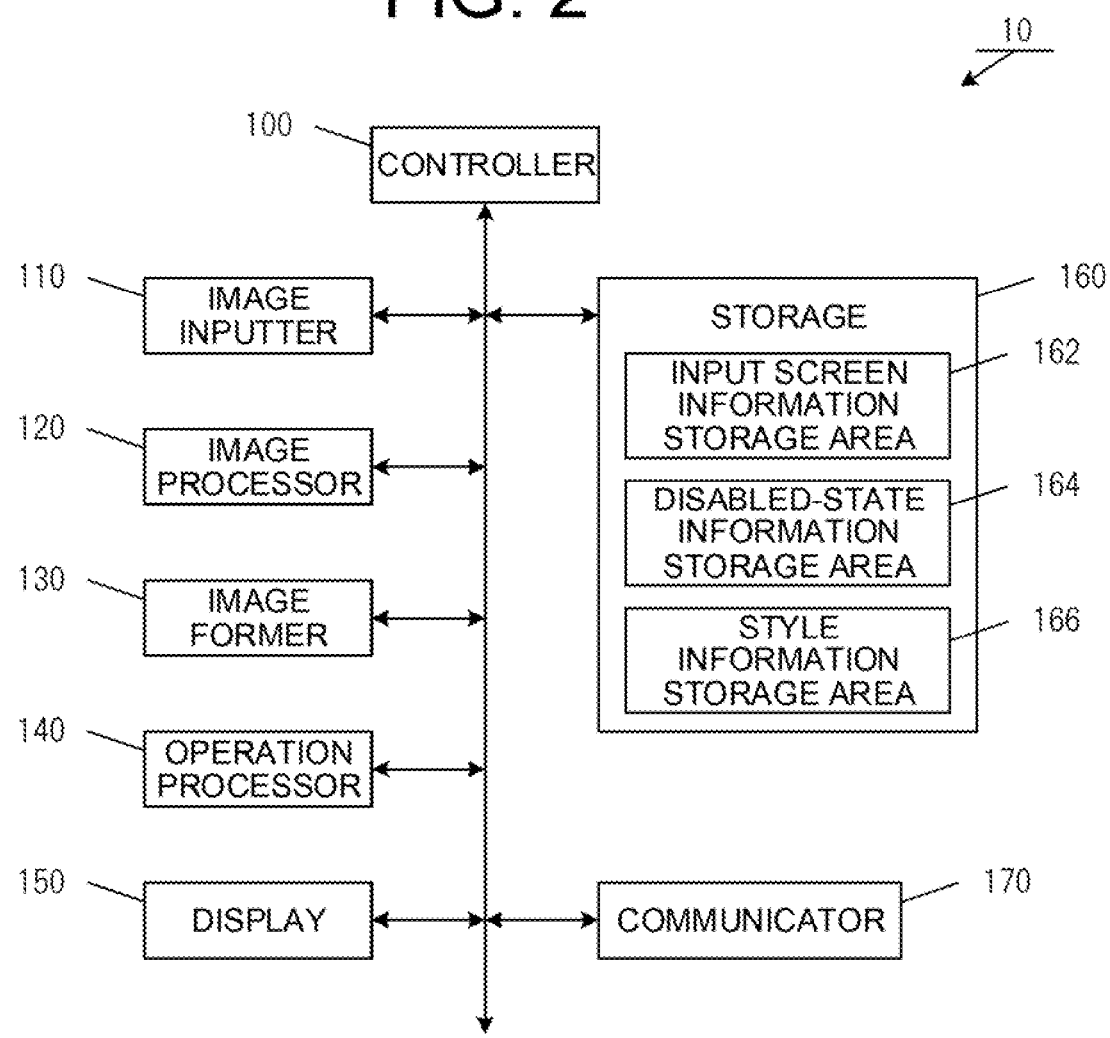
FIG. 2 is a diagram for explaining a functional configuration of the image forming apparatus according to the first embodiment.

As illustrated in FIG. 2, the image forming apparatus 10 includes a controller 100, an image inputter 110, an image processor 120, an image former 130, an operation processor 140, a display 150, a storage 160, and a communicator 170.

The controller 100 is a functional unit that controls the entire image forming apparatus 10. The controller 100 realizes various functions by reading and executing various programs, and includes, for example, one or a plurality of arithmetic devices (for example, a Central Processing Unit (CPU)).

The image inputter 110 is a functional unit that reads image data input to the image forming apparatus 10. The image inputter 110 is coupled to a document reader 112 being a functional unit that reads an image of a document, and receives image data output from the document reader 112. Further, the image inputter 110 may receive image data from a storage medium such as a Universal Serial Bus (USB) memory or an SD card, or may include a communicator that connects to another terminal device to receive the image data input from the other terminal device.

The image processor 120 is a functional unit that performs various image processes on image data. For example, the image processor 120 performs a sharpening process on image data or performs a color conversion process thereon.

The image former 130 is a functional unit that forms, on a recording medium (for example, a recording sheet), output data based on image data. For example, a recording sheet is fed from a paper feed tray 122 of FIG. 1, and after an image is formed, in the image former 130, on a surface of the recording sheet, the sheet is ejected from a paper discharge tray 124. The image former 130 includes, for example, a laser printer or the like utilizing an electrophotographic method.

The operation processor 140 is a functional unit that receives operational instructions from a user, and includes various key switches, a device that detects a touch input, and the like. The user can use the operation processor 140 to input a function to be used and an output condition. The display 150 is a functional unit that displays various types of information to the user, and includes, for example, a Liquid Crystal Display (LCD). It is noted that the image forming apparatus 10 may include a touch panel in which the operation processor 140 and the display 150 are integrally formed. In this case, a method for detecting an input on the touch panel may be a common detection method such as a resistive method, touch screen technology utilizing infrared or electromagnetic induction, or a capacitive method.

The storage 160 is a functional unit that stores various programs and various data necessary for an operation of the image forming apparatus 10. The storage 160 includes, for example, a Solid State Drive (SSD) that is a semiconductor memory, and a Hard Disk Drive (HDD).

Further, there are secured an input screen information storage area 162, a disabled-state information storage area 164, and a style information storage area 166 in the storage 160.

The input screen information storage area 162 is an area where input screen information is stored. The input screen information is information for configuring an input screen to be displayed on the display 150. The input screen is a screen that allows a user to input and select information. In the present embodiment, description proceeds with an assumption that the input screen is a screen for setting the operation of the image forming apparatus 10. For example, the input screen information may be information in which various input fields are arranged as input items in a form, or information in which input items are arranged in HTML or XML.

FIG. 3 is a table showing the input screen information in the present embodiment. As shown in FIG. 3, in the input screen information, an area name (for example, "S/MIME setting") for specifying an area included in the input screen and input item information or information on the input item arranged in the area, are stored. An example of FIG. 3 indicates that the input screen has areas such as "S/MIME setting", "device certificate", and "electronic signature setting". Thus, the input screen includes one or a plurality of areas.

Each of the areas includes one or a plurality of input items, and in the input item, an input item name and an input element are displayed. The input element is an element displayed on the input screen, and is an element where an input value can be changed based on a display of a current input value or a user operation detected by the operation processor 140. Specifically, the input element includes a text box, a check box, a radio button, a drop-down list, a list, a toggle button, a button group, a slider, a spin button, and a form for selecting a file, for example. Such an input element is arranged in an area corresponding to the input item, based on the input screen information. In addition, the input item may include one or a plurality of input elements. For example, two input elements (radio buttons) of "enable" and "disable" may be displayed in one input item.

In the input item information, an input item name (for example, "S/MIME encryption") for specifying an input item, an input element (for example, "drop-down list") indicating a type of element to be displayed to accept an operation for inputting and changing an input value for the input item, choices (for example, "enable, disable") to be displayed in the input element if the input element is one input element to be selected from among a plurality of choices (for example, a drop-down list), and a current input value (for example, "disable"), are stored.

For example, in an example shown in FIG. 3, an area whose area name is "electronic signature setting" includes two input items of "electronic signature" and "signature algorithm". Further, the input elements of "electronic signature" and "signature algorithm" are both "drop-down lists". Therefore, in the "electronic signature setting" area of the display 150, an input screen in which the above-described two input items include the input elements of the drop-down lists is displayed.

The input element has an "enabled state" in which an input operation from the user can be received and a "disabled state" in which the input operation from the user cannot be received. The controller 100 can switch between the enabled state and the disabled state for the input element.

In the present embodiment, in the following description, switching between the enabled state and the disabled state is performed for each input element, but may be performed for each input item or for each area. For example, if the input item is changed to the disabled state, all the input elements included in the input item are in the disabled state.

The disabled-state information storage area 164 is an area for storing disabled-state information. The disabled-state information is information indicating a condition for disabling an input element and indicating an input item (input item name) including an input element to be disabled. FIG. 4 is a table showing the disabled-state information in the present embodiment. As shown in FIG. 4, an input item name (for example, "S/MIME encryption"), an object input value being an input value in a case where another input item is disabled (for example, "disable"), a disabled input item name for specifying an input item to be disabled (for example, "electronic signature, signature algorithm"), and a style name (for example, "style 1") for specifying a method of identifiably displaying an area in which a disabled input element is arranged (hereinafter referred to as "identifiable display target area"), are stored in the disabled-state information.

A specific example of the disabled-state information will be described. It is assumed that as the disabled-state information, the input item name with "S/MIME encryption", the object input value with "disable", and the disabled input item name with "electronic signature, signature algorithm", are stored. The disabled-state information indicates that if the input value of the input item whose input item name is "S/MIME encryption" (hereinafter described as the input item name "S/MIME encryption") is "disable", the controller 100 disables the input element of the input item name "electronic signature" and the input element of the input item name "signature algorithm".

A case where the input value of the input item name "S/MIME encryption" is "disable" is a case where the user inputs or selects "disable" in the input element of the input item name "S/MIME encryption". In addition, the case includes another case where the input value of the input item name "S/MIME encryption" is already "disable" at the time that the input screen is displayed.

Thus, if the input value of one input item is the same as the object input value, another input item related to the one input item is affected, and consequently, the input element for the other input item is disabled, as a result of which an input by the user is infeasible/inhibited. Examples where one input item affects another input item include (1) a case where the input value of the one input item is subordinate to the input value of the other input item, and (2) a case where the one input item and the other input item are mutually exclusive.

The example (1), as mentioned before, is a case where if the input value of the input item name "S/MIME encryption" is "disable", the input element of the input item name "electronic signature" is disabled. In other words, this means that the input value of the input item name "electronic signature" affects an operation of the image forming apparatus 10 only if the input value of the input item name "S/MIME encryption" is "enable". Thus, whether or not the input value of a certain input item affects an operation of the image forming apparatus 10 may depend on an input value of another input item other than the input item. If the input value of one input item does not affect an operation of the image forming apparatus 10, the one input item is disabled so that an unnecessary input operation by the user can be eliminated.

The example (2) corresponds to a relationship between "stapling" and "bookbinding" in FIG. 4. For example, if the input value for using a stapling function is input to the input item name "stapling", the input item name "bookbinding" is disabled to not enable the use of a bookbinding function. Further, if the input value for using the bookbinding function is input to the input item name "bookbinding", the input item name "stapling" is disabled to not enable the use of the stapling function. Thus, the "stapling" function and the "bookbinding" function cannot be used at the same time. In this case, if the "stapling" function is used, the input value of the input item name "bookbinding" is set to "disable", and the input element is disabled. This eliminates a setting in which the user uses the "stapling" function and the "bookbinding" function at the same time. As described above, if one input item and another input item are mutually exclusive, when the input item of the other input item is disabled according to the input value of the one input item, it is possible to avoid the user from inputting an inconsistent input value.

The style name is information for specifying a style information stored in the style information storage area 166.

The style information storage area 166 is an area for storing style information. The style information is information defining a display mode (style) in which an area in which a disabled input element is arranged (hereinafter referred to as "identifiable display target area") is identifiably displayed. FIG. 5 is a table showing the style information in the present embodiment. As shown in FIG. 5, in the style information, a style name (for example, "default") being a name for a display mode and a corresponding color (for example, "gray") being a color corresponding to the style, are stored.

In the present embodiment, for the display mode of the identifiable display, a corresponding color is displayed in the identifiable display target area. It is noted that another display mode may be used. For example, the identifiable display target area may be blinked, a color or a size of a word in the identifiable display target area may be changed, and a predetermined icon or the like may be displayed. Information necessary for realizing such an identifiable display is stored as the style information.

The communicator 170 is a functional unit used by the image forming apparatus 10 to communicate with another device. For example, the communicator 170 is realized by a Network Interface Card (NIC) used in a wired/wireless LAN or a communication module connectable to a 3G/LTE/5G line.

1. 2 Process Flow

Subsequently, a process flow of the image forming apparatus 10 will be described. It is noted that the following description is an example of a process for realizing an object of the present invention, and an order of steps may be changed or some steps may be omitted without contradiction.

Figure 6:
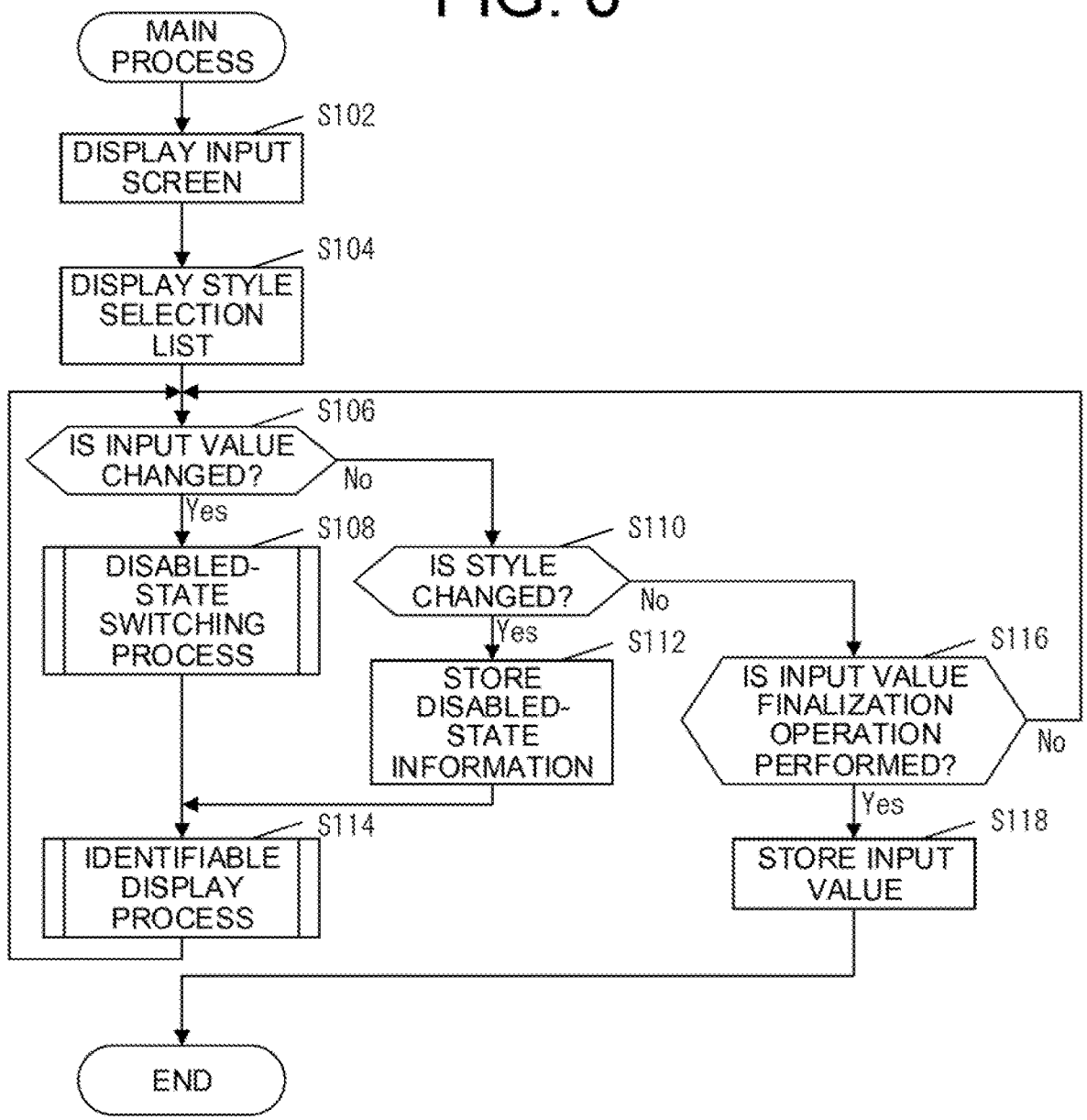
FIG. 6 is a flowchart for explaining a main process according to the first embodiment.

With reference to FIG. 6, a flow of a main process of the image forming apparatus 10 will be described. First, the controller 100 reads input screen information from the input screen information storage area 162 and displays an input screen (step S102). Specifically, the controller 100 arranges input item information for each area name. The controller 100 generates an area for each area name in the input screen. The controller 100 arranges an input item (an input item name and an input element) in the generated area, based on the input item information. It is noted that the area generated in the input screen can be specified by the area name, and the input element arranged in the area can be specified by the input item name. For example, if the input screen is created using Hyper Text Markup Language (HTML), the input screen can be realized as follows: an id attribute, a name attribute, and a custom data attribute are set for the area or the input element, and the attribute value is set as the input item name.

Further, the controller 100 reads the disabled-state information stored in the disabled-state information storage area 164, and displays a list for selecting a style (style selection list) in an area corresponding to the input item name of the disabled-state information, in the input screen displayed in step S102 (step S104). The style selection list is a list for changing the style name stored in the disabled-state information. The controller 100 reads the style information stored in the style information storage area 166 and acquires style names that can be selected by the user. The controller 100 displays a list where the user can select the selectable style names, for each area corresponding to the input item name of the disabled-state information. At this time, the controller 100 brings the style name stored in the disabled-state information corresponding to the area where the style selection list is displayed, out of the items included in the style selection list, into a previously selected state. Thus, it is possible to display which style is currently selected from among the selectable styles.

Subsequently, the controller 100 decides whether or not the input value of the input element is changed by the user (step S106). The input value is changed by an operation where the user inputs a value into the input element or selects one choice from choices displayed in the input element. If such an input operation is performed, the controller 100 executes a disabled-state switching process (step S108).

Figure 7:
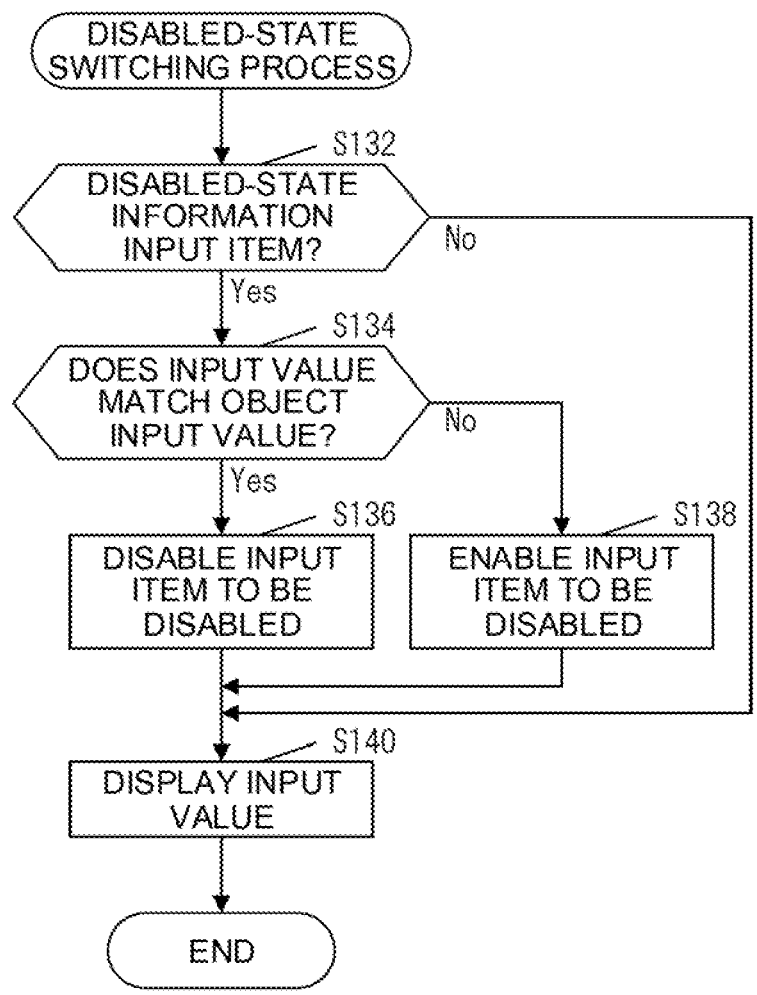
FIG. 7 is a flowchart for explaining a disabled-state switching process according to the first embodiment.

The disabled-state switching process will be described with reference to FIG. 7. First, the controller 100 reads the disabled-state information from the disabled-state information storage area 164. Next, the controller 100 decides whether or not the input item name of the input item whose input value is changed in step S106 matches any of the input item names of the read disabled-state information (step S132).

The controller 100 specifies the disabled-state information in which the input item name of the input item whose input value is changed matched the input item name of the disabled-state information, as object disabled-state information. Next, the controller 100 decides whether or not the object input value stored in the object disabled-state information matches the input value changed in step S106 (step S132; Yes to step S134).

If the object input value stored in the object disabled-state information matches the input value, the controller 100 disables the input item specified by the disabled input item name stored in the object disabled-state information (step S134; Yes to step S136). On the other hand, if the object input value stored in the object disabled-state information does not match the input value, the controller 100 enables the input item specified by the disabled input item name stored in the object disabled-state information (step S134; No to step S138). It is noted that the process of step S138 may be executed only if the input item to be disabled is in the disabled state.

It is noted that if the input item name of the input item whose input value is changed does not match any of the input item names of the disabled-state information, the change of the input value in step S106 does not affect switching of a disabled state or an enabled state of another input item (step S132; No). Therefore, the processes in steps S134 to S138 described above are skipped.

Then, the controller 100 displays the input value input by the user in the input item whose input value is changed in step S106 (step S140), and ends the disabled-state switching process.

Returning to FIG. 6, if the input value is not changed, the controller 100 decides whether the style is changed after one style is selected by the user from the style selection list displayed in step S104 (step S106; No to step S110). If the style is changed, the controller 100 reads the disabled-state information in which the input item name of the input item whose style is changed matches the input item name of the disabled-state information, from the disabled-state information storage area 164. The controller 100 changes the style name stored in the read disabled-state information to the style name of the style selected in step S110, and stores the changed disabled-state information into the disabled-state information storage area 164 (step S110; Yes to step S112).

Subsequently, the controller 100 executes an identifiable display process (step S114). The identifiable display process will be described with reference to FIG. 8. First, the controller 100 reads one piece of disabled-state information stored in the disabled-state information storage area 164 (step S152). Next, the controller 100 decides whether or not the input item corresponding to a disabled input item name of the read disabled-state information exists in the input screen (step S154).

If the input item corresponding to the disabled input item name of the read disabled-state information exists in the input screen, the controller 100 decides whether or not the input item corresponding to the disabled input item name of the disabled-state information is in a disabled state (step S154; Yes to step S156). If the input item is in a disabled state (step S156; Yes), the area including the input item in a disabled state is the identifiable display target area. In this manner, the identifiable display target area included in the input screen is determined in the processes in steps S154 to S156. It is noted that the controller 100 can determine a cause why the input item is disabled is that the object input value is input into the input value specified by the input item name stored in the disabled-state information read in step S154.

Next, the controller 100 specifies the style name stored in the disabled-state information read in step S152 (step S158). Next, the controller 100 reads the style information in which the style name stored in the style information matches the style name specified in step S160, from among the style information storage area 166 (step S160).

Subsequently, based on the read style information, the controller 100 identifiably displays the area including the disabled input item (step S162). In the present embodiment, a corresponding color is stored in the style information. Therefore, the controller 100 controls the display 150 to identifiably display the identifiable display target area determined in step S154 and step S156 by using the corresponding color stored in the style information read in step S160. Thus, the controller 100 can identifiably display the identifiable display target area, based on a cause why the input item is disabled. Further, upon viewing the corresponding color, the user can know the input item that leads to the disabled state and a cause why the input item is disabled.

When identifiably displaying the identifiable display target area, the controller 100 calculates a range occupied by the identifiable display target area in the input screen to identifiably display the identifiable display target area by superimposing the corresponding color, for example. At this time, the corresponding color may be made semi-transparent for the user to visually recognize the disabled input element. Further, a background color of the identifiable display target area may be a corresponding color. If the input screen is realized in HTML, the style applied to the identifiable display target area is expressed by a style sheet. The style sheet may be dynamically generated, based on the style information.

The range of the area to be identifiably displayed may be the same in size as the identifiable display target area, or may be larger or smaller than the identifiable display target area. The corresponding color may be superimposed only on the disabled input element. As long as the area including the disabled input element is displayed in the corresponding color stored in the style information, a manner in which the area is identifiably displayed is a design matter.

On the other hand, if the input item is enabled in step S156, the controller 100 cancels the identifiable display (step S156; No to step S164). In this case, the input item that has been disabled until this step is made enabled in step S138. In such a case, the identifiable display is canceled, and now the input screen allows the user to change the input value of the input item. It is noted that the process of step S164 may be executed only if the area including the input item determined in step S154 is identifiably displayed.

It is noted that, in step S154, if the input screen has no input item corresponding to the disabled input item name of the disabled-state information, there is no area to be identifiably displayed or no area where the identifiable display is to be canceled, in the input screen. Therefore, steps S156 to S164 are skipped (step S154; No).

Subsequently, the controller 100 decides whether or not all the disabled-state information stored in the disabled-state information storage area 164 are read, if the controller 100 reads all the disabled-state information, the identifiable display process is ended (step S166; Yes). If there is still the unread disabled-state information, the process returns to step S152 (step S166; No to step S152).

Returning to FIG. 6, subsequently, the controller 100 decides whether or not an operation of finalizing the input value is performed by the user (step S116). The input value finalization operation is, for example, an operation of selecting a button for applying a setting, or an operation of starting a process of forming an image on a recording sheet, that is, an operation of starting printing. If such an operation is performed, the controller 100 stores, as the input value, a value input or selected in the input element, into the input screen information storage area 162 (step S118). This allows the image forming apparatus 10 to perform a process in accordance with the input value. It is noted that if none of the input value change operation, the style change operation, or the input value finalization operation is performed, the process returns to step S106 (step S116; No to step S106).

1. 3 Operation Example

Figure 9A:
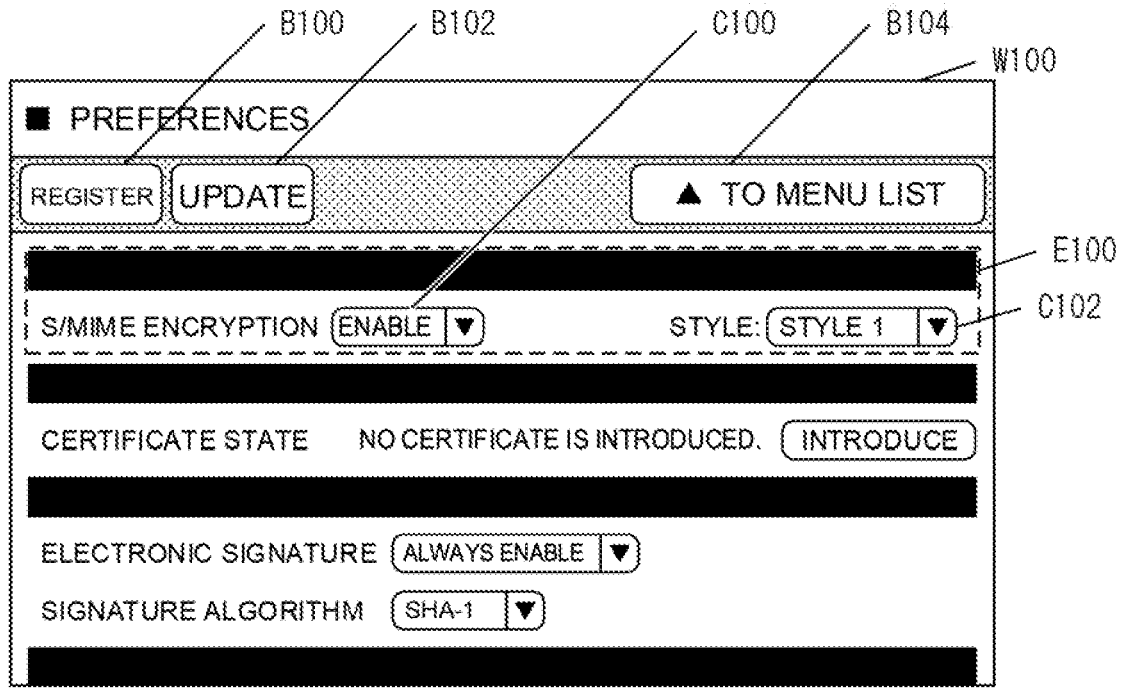
FIG. 9A and FIG. 9B are diagrams each illustrating an example of an operation according to the first embodiment.
Figure 9B:
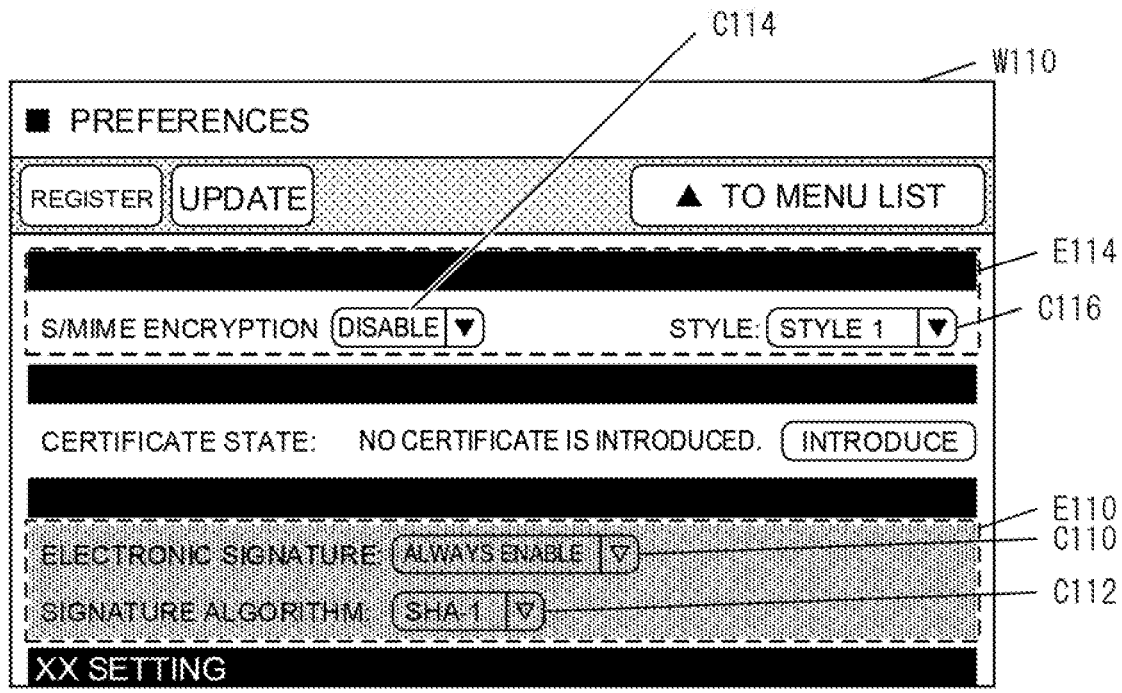

Next, an operation example will be described with reference to the drawings. FIG. 9A and FIG. 9B are examples of input screens displayed based on the input screen information shown in FIG. 3 while the input screen information shown in FIG. 3 is stored in the input screen information storage area 162. Further, description proceeds with an assumption that the information shown in FIG. 4 is already stored in the disabled-state information storage area 164 and the information shown in FIG. 5 is already stored in the style information storage area, respectively.

FIG. 9A is an example of a screen of an input screen W100 for setting an operation of the image forming apparatus 10. In FIG. 9A, the input screen W100 includes an area E100 with the area name "S/MIME setting". In the area E100, an input element C100 for the input item name "S/MIME encryption" is arranged. It is noted that, as illustrated in FIG. 9A, the area name and the input item name are displayed in the area E100; however, the area name and the input item name may not be displayed. Similarly to the area E100, the input screen W100 includes areas such as "device certificate" and "electronic signature setting". In each of the areas, the input element for the area is arranged.

Here, if a value of disabling another input item is input for the input value of the input item name "S/MIME encryption", the other input item is disabled and the identifiable display target area including the other input item is identifiably displayed in a predetermined style. Therefore, the area E100 includes a style selection list C102 being a list for selecting a style for identifiably displaying the identifiable display target area. The user can select the style for identifiably displaying the identifiable display target area from the style selection list C102.

The input screen W100 includes an update button B102 and a registration button B100 for performing an input value finalization operation. When selecting the registration button B100 or the update button B102, the user can instruct the image forming apparatus 10 to store the input value displayed in the input screen information. It is noted that if the registration button B100 is selected, an original screen (for example, a menu list screen) may be restored, and if the update button B102 is selected, the original screen is not restored but the input screen W100 may be continuously displayed. The input screen W100 may include a menu list button B104 for applying an instruction to delete the input value input by the user and to restore the original screen.

FIG. 9B is a screen example of an input screen W110 where an input element C110 of the input item name "electronic signature" and an input element C112 of the input item name "signature algorithm" are disabled. As illustrated in FIG. 9B, the identifiable display target area E110 including the disabled input elements is identifiably displayed, based on the style information specified by the style name stored in the disabled-state information. Therefore, the identifiable display target area E110 is identifiably displayed in the corresponding color ("pink" in an example of FIG. 5) of the style information specified by the style name ("style 1" in an example of FIG. 4) stored in the disabled-state information. When confirming that an area including the input element C110 and the input element C112 is displayed in pink, the user can understand that the cause of the disabled state of the input element C110 and the input element C112 is the input value of the input item name "S/MIME encryption".

Figure 10:
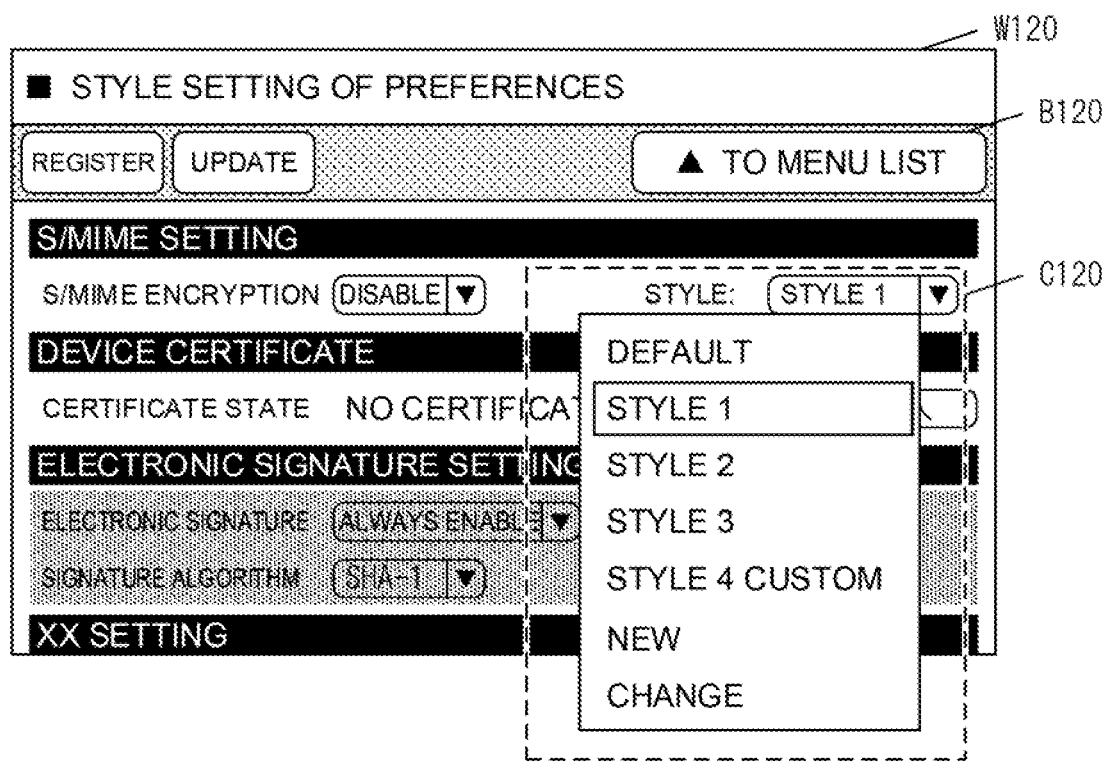
FIG. 10 is a diagram illustrating an example of an operation according to the first embodiment.

FIG. 10 is a screen example of an input screen W120 obtained when the style selection list C120 is selected by the user. If the style selection list C120 is selected by the user, style names selectable by the user are displayed in a list format. The user selects one mode for identifiably displaying the identifiable display target area, with reference to the style name, from among the list.

In addition to the style name, an item "new" for storing a new style and an item "change" for changing an existing style may be provided in the list. If the item "new" or the item "change" is selected by the user, the current screen is transitioned to a screen for storing a new style or changing an existing style.

It is noted that the transition to a screen for storing a new style or changing an existing style may not be a list item. For example, the item for transitioning to the screen for newly storing or changing a style may be displayed in the menu list screen that displays menu items for setting the image forming apparatus 10 in a list format. When selecting the item, included in the menu list screen, for transitioning to the screen for newly storing or changing a style, the user can add or change the style. In this case, the image forming apparatus 10 may display the menu list screen if a "to menu list" button B120 included in the input screen W120 is selected by the user.

Figure 11A:
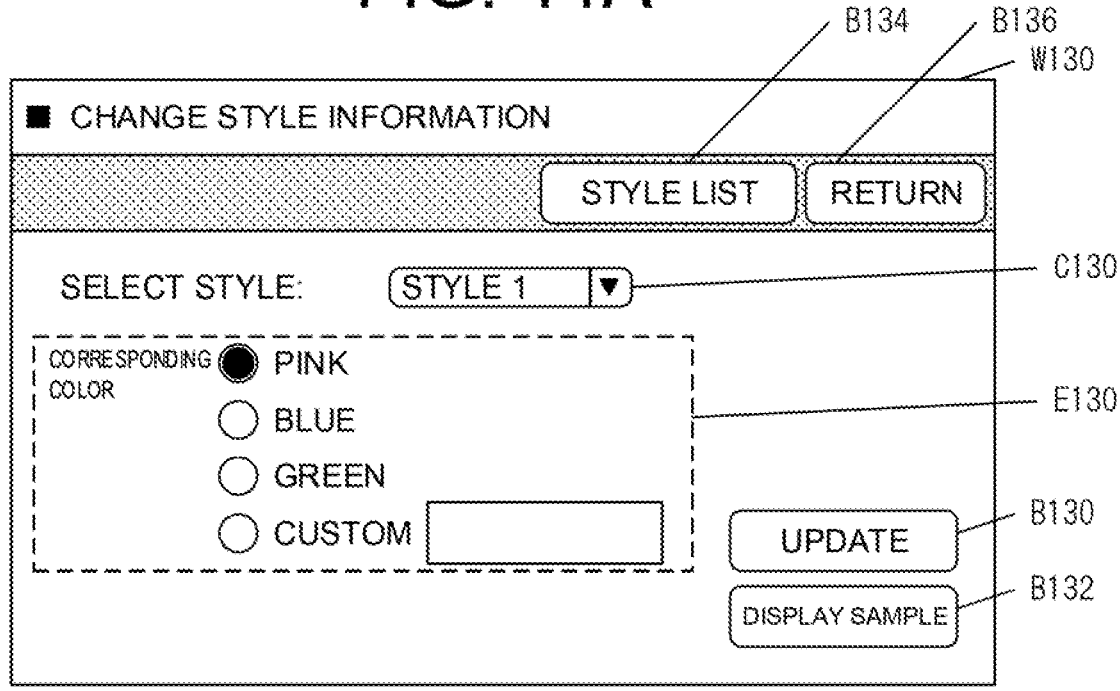
FIG. 11A and FIG. 11B are diagrams each illustrating an example of an operation according to the first embodiment.

FIG. 11A is a screen example of a display screen W130 for changing the style information, displayed on the display 150 if "change" is selected in FIG. 10. The display screen W130 includes an update button B130 for storing the style information, a sample display button B132 for displaying the input screen where the identifiable display target area is identifiably displayed, a style list button B134 for displaying a style information list display screen, and a return button B136 for returning to the input screen W120. The display screen W130 further includes a list C130 for designating the style information to be changed and an area E130 including a radio button for designating a corresponding color. In the list C130, a style name is to be displayed.

The user can select a corresponding color for a style selected from the list C130, from the area E130. It is noted that the corresponding color may be selected from colors prepared in advance, or the user may be able to input a color value (such as a color code, an RGB value, and an HSV value), or a color value may be randomly generated. Further, the user can store the corresponding color corresponding to the style designated in the list C130 into the image forming apparatus 10 by selecting the update button B130. In this way, the user can specify the color used when the identifiable display target area is identifiably displayed.

Figure 11B:
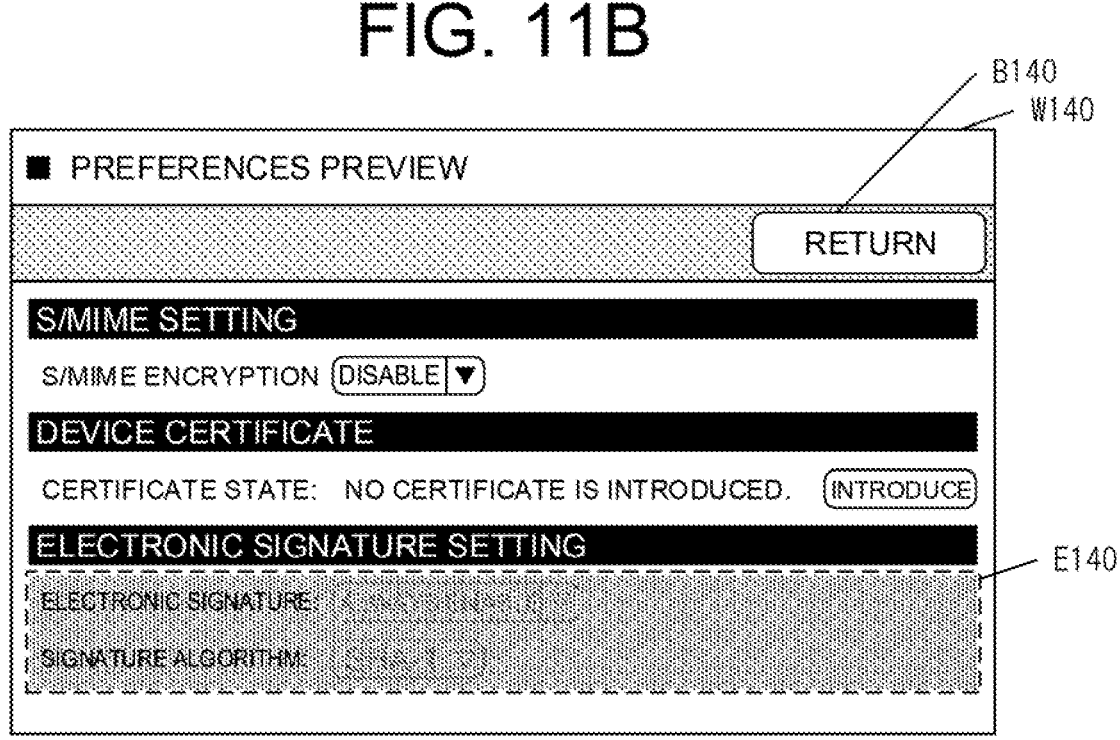

If the sample display button B132 is selected by the user, the image forming apparatus 10 displays a display screen W140 illustrated in FIG. 11B on the display 150. The display screen W140 is a screen reproducing the input screen obtained when the identifiable display target area is identifiably displayed in the corresponding color, based on the style information. The user can update the style information while viewing the display screen W140.

It is noted that the sample display button B132 may be displayed in the input screen W120 illustrated in FIG. 10. In this case, if the sample display button B132 is selected by the user, a display manner obtained when an area that can be an identifiable display target area, out of the areas included in the input screen W120, is identifiably displayed is temporarily displayed. Thus, the user can confirm how the identifiable display target area is identifiably displayed.

It is noted if "new" is selected by the user, new style information may be added by the user. If "new" is selected by the user, the image forming apparatus 10 displays the display screen W130 illustrated in FIG. 11A; however, at this time, a text field for inputting the style name may be further included in the display screen W130. Thus, the user can specify a specific style name for the style information. It is noted that the style name may not be specifiable by the user, and for example, a serial number may be added to a word "style".

In addition, the update button B130 in the display screen W130 functions as a button (for example, a registration button) for storing the style information. If the update button B130 is selected by the user, the controller 100 stores, as the style information, the style information input by the user, into the style information storage area 166. Thus, if the style information is newly stored by the user, the style names including the style name of the added style information are displayed in a list format in the style selection list.

Figure 12A:
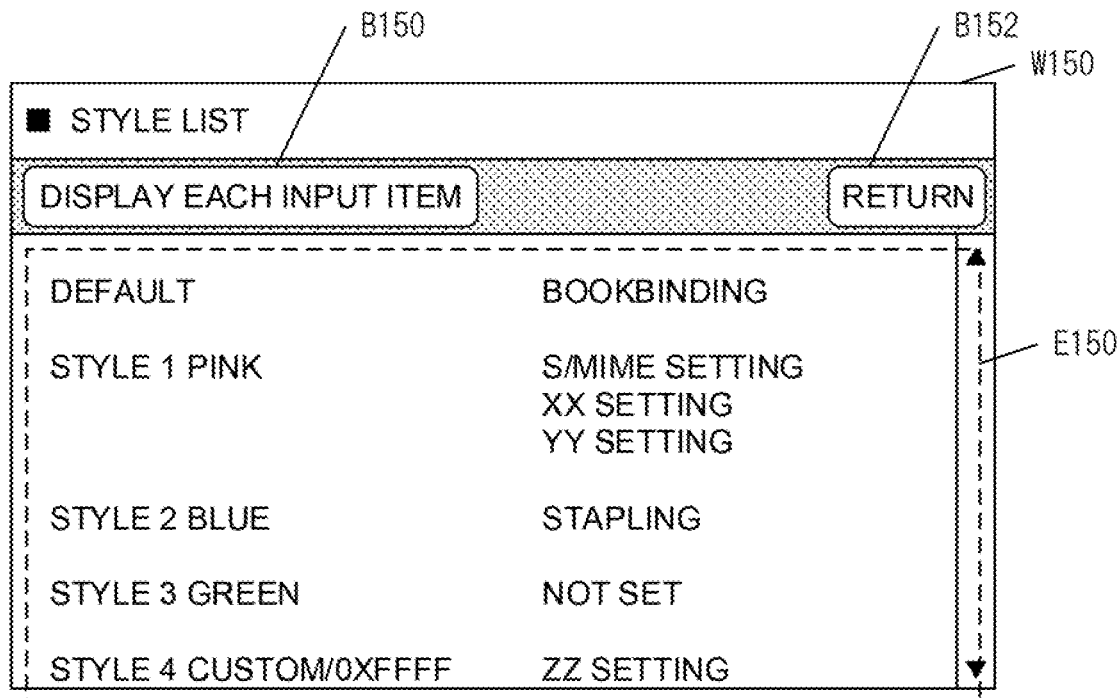
FIG. 12A and FIG. 12B are diagrams each illustrating an example of an operation according to the first embodiment.

FIG. 12A is a screen example of a display screen W150 displaying a list of style information. The image forming apparatus 10 displays the display screen W150 if the style list button B134 is selected by the user. The display screen W150 includes an area E150 displaying a list of style names associated with the area names. For example, in the area E150, the style names are displayed on the left side, and the area names are displayed on the right side. At this time, an area name corresponding to one style name are displayed. For example, FIG. 12A illustrates a case where based on the style information, three area names of "S/MIME setting", "xx setting", and "yy setting" are set for the area names corresponding to the style name "style 1".

It is noted that the style list button B134 may be displayed in the input screen W120 illustrated in FIG. 10. In this case, if the style list button B134 is selected by the user, the display screen W150 displaying a list of style information is displayed. Thus, the user can confirm by which input item the identifiable display style of the identifiable display target area is disabled.

Figure 12B:
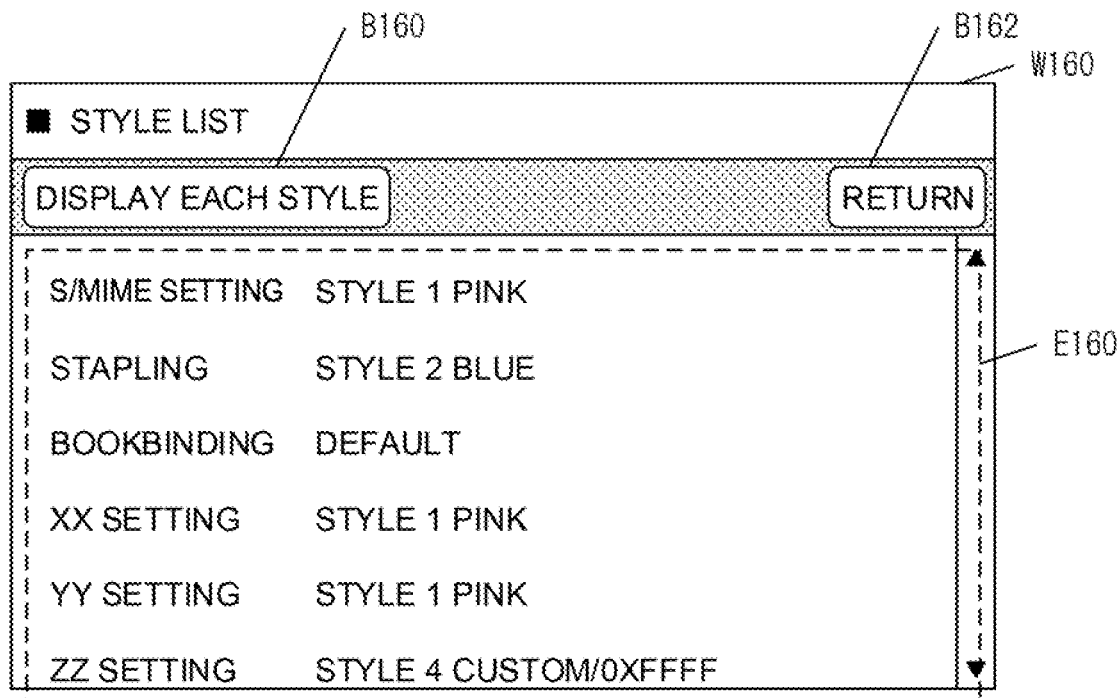

The display screen W150 includes a button B150 for switching a display format and a button B152 for returning to the display screen W130. If the button B150 is selected by the user, a display screen W160 obtained by switching the display format of the style information list display screen illustrated in FIG. 12B, is displayed. The display screen W160 includes an area E160 displaying a list of area names associated with the style names. For example, in the area E160, the area names are displayed on the left side, and the style names are displayed on the right side. For example, FIG. 12B illustrates that "style 1" is associated as the style name corresponding to the area name "S/MIME setting", based on the style information.

It is noted that as illustrated in FIG. 12A and FIG. 12B, the display screen W150 and the display screen W160 may display the corresponding color together with the style name (for example, "pink" or "0xFFFF"). Further, the style name corresponding to the area name may be changed from the display screen W150 and the display screen W160, or new style information may be generated and associated with an area name.

If there are two or more input items that cause one input item to be disabled, there are a plurality of corresponding colors. In this case, the image forming apparatus 10 may identifiably display the identifiable display target area by gradation of the corresponding colors. Further, the range of the identifiable display target area may be divided, and the respective divided areas may be displayed in different corresponding colors. If an icon is displayed for the identifiable display, a plurality of icons are displayed in the identifiable display target area. As described above, if there are a plurality of causes, the image forming apparatus 10 displays the plurality of causes on the display 150 in such a manner that the user can identify the causes.

The style selection list may not constantly be displayed on the input screen. For example, in response to a need to disable another input item by an input value input in a certain input item, the style selection list may be displayed in an area including the input item in which the input value is input. Further, a mode for displaying the style selection list and a mode for not displaying the style selection list may be prepared, and the modes may be switched by the user to switch whether or not the style selection list is displayed.

In the description of the present embodiment, the selection of the style for identifiably displaying the identifiable display target area and the addition/change of the style information are performed by the user; however, the addition/change of the style information and the selection of the style may be performed by an external device. For example, the image forming apparatus 10 may include a function of displaying a setting screen in a terminal device connected to a network, and the style information may be added or changed from the setting screen of the terminal device.

According to the present embodiment, the user can identify the input item causing the disabled state upon viewing the identifiable display target area. Since the method of identifiably displaying an area can be specified by the user, the user can easily determine the cause of the disabled state. In addition, it is possible to manage/reference the corresponding colors for the identifiable display in a list format, and to confirm a default setting and a setting customized by the user.

Further, since the identifiable display is displayed in the area arranged with the input element, it is not necessary to secure an area for performing the identifiable display.

In addition, if a cause of one disabled input element results from input values of a plurality of input items, the user can know that the cause includes a plurality of causes because the identifiable display target area is identifiably displayed by gradation or the like.

In the description of the present embodiment, the present invention is applied to the image forming apparatus 10 and the identifiable display target area is identifiably displayed in the setting screen displayed on the display 150; however, the present invention may be naturally applied to a device other than the image forming apparatus 10. For example, if the setting screen of the image forming apparatus 10 is displayed on a Web browser, a style sheet may be dynamically created, based on the style information, for the setting screen displayed on the Web browser, and applied to HTML.

Moreover, in the description of the present embodiment, a corresponding color is set for an area; however, a corresponding color may be set for an input item. Thus, it is possible to determine clearly an input item that causes a disabled state. It is noted that the setting of the corresponding color for each area and the setting of the corresponding color for each input item may be mixed. Thus, it is possible to change, for each function and for each input item, a color used when the identifiable display target area is displayed.

The present embodiment can be applied not only to the setting screen of an apparatus such as the image forming apparatus 10 but also to a screen such as a questionnaire form, an inquiry form, and a billing form. For example, if a user's residence is required to be input, a screen is displayed which includes an area arranged with an input element of a postal code and an area arranged with an input element of an address. At this time, if the input value of the postal code is disabled, the area arranged with the input element of the address is identifiably displayed. If the user is required to input card information, a screen is displayed which includes an area arranged with an input element for selecting a card company and an area arranged with an input element of a card number and an expiration date. At this time, if the input value of the card company is not selected, the area arranged with the input element of the card number and the like is identifiably displayed. As for a payment method, if the user is required to exclusively select any one of a credit card, a bank transfer, a cash on delivery, a carrier payment, and the like, another payment method can be identifiably displayed when one payment method is selected. Thus, the present invention can be applied to a general form screen other than the setting screen.

2. Second Embodiment

Next, a second embodiment will be described. The second embodiment is an embodiment where, in addition to the process in the first embodiment, when an identifiable display target area is selected, an area including an input item that causes an input item included in the identifiable display target area to be disabled is displayed. It is noted that an area including an input item that causes an input item included in an identifiable display target area to be disabled is hereinafter referred to as "corresponding area". In the present embodiment, FIG. 6 of the first embodiment is replaced with FIG. 13. It is noted that the same numeral or symbol is attached to the same functional unit and process, and the duplicated part is not described.

2. 1 Process Flow

Figure 13:
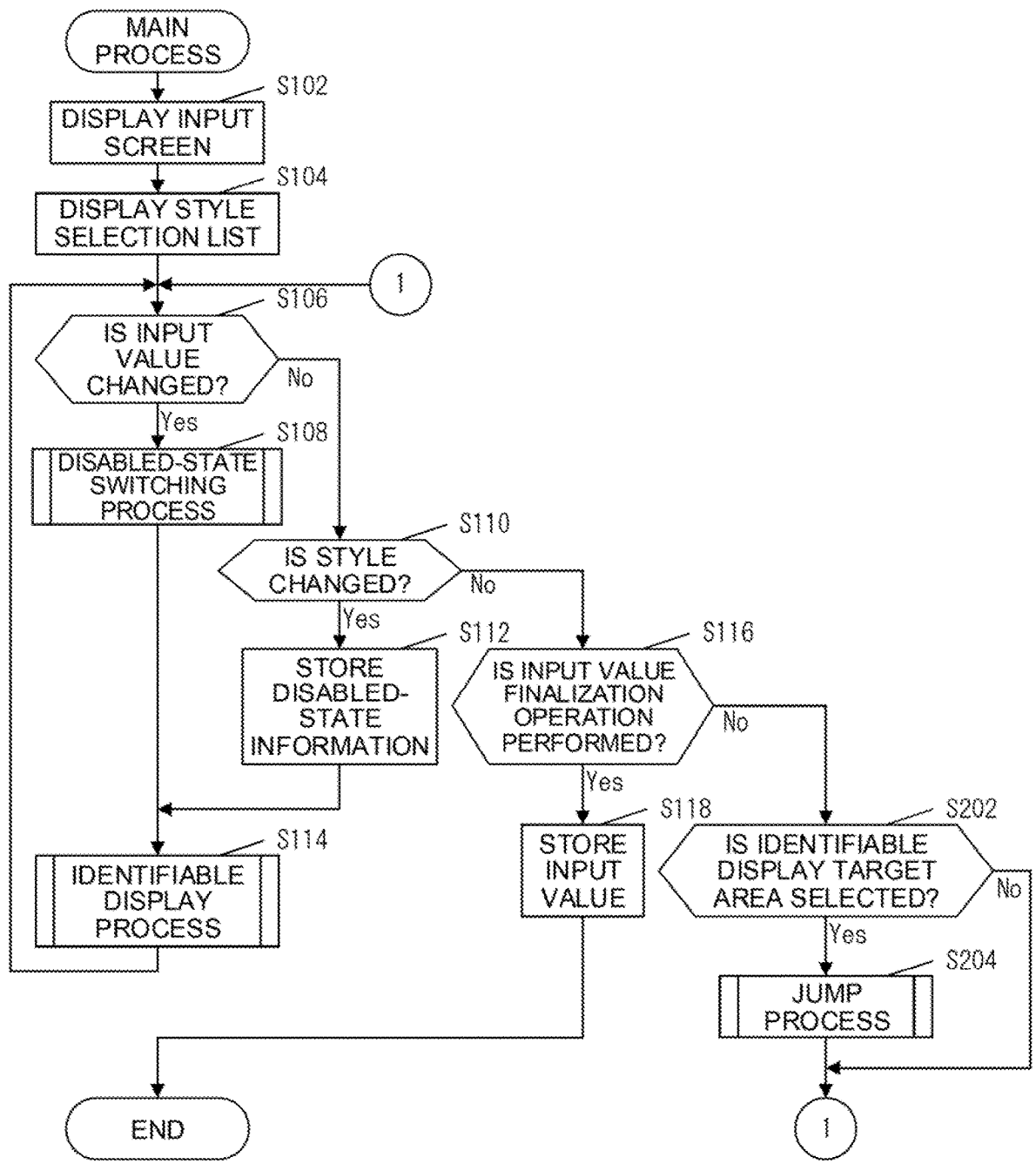
FIG. 13 is a flowchart for explaining a main process according to a second embodiment.

With reference to the drawings, a flow of a main process of the image forming apparatus 10 in the present embodiment will be described. FIG. 13 is a flowchart a flow of a main process of the present embodiment. If none of the input value change, the style change, or the input value finalization operation is performed, the controller 100 then decides whether or not the identifiable display target area is selected by the user (step S202). A case where the identifiable display target area is selected is, for example, a case where the identifiably displayed area is operated by a touch of the user. It is noted that the case may be a case where the identifiable display target area may also be selected by clicking or double clicking the identifiably displayed area with a mouse. The case may be a case where the identifiable display target area may also be selected by shifting a focus sequentially on the areas included in the input screen while the user operates a hard key (such as a keyboard) to select one of the identifiably displayed areas.

If the identifiable display target area is selected, the controller 100 executes a jump process (step S202; Yes to step S204). In the jump process, areas to be displayed on the display 150 are switched between the identifiable display target area and the corresponding area to realize display as if jumping between the two areas is performed. It is noted that, in step S202, if the identifiable display target area is not selected by the user, the process returns to step S106 (step S202; No to step S106).

The jump process will be described with reference to FIG. 14. First, the controller 100 reads one piece of disabled-state information from the disabled-state information storage area 164 (step S282). Next, the controller 100 decides whether or not the disabled input item name of the read disabled-state information matches the input item name of the input item included in the identifiable display target area selected in step S202 (step S284). If these match, the read disabled-state information is disabled-state information that causes the input item included in the identifiable display target area selected by the user to be disabled. That is, the area including the input item stored in the read disabled-state information is the corresponding area. Therefore, the controller 100 displays the corresponding area on the display 150 (step S286).

At this time, the controller 100 may blink the corresponding area, blink or enlarge a word indicating the area name, and display a background color different from a background color of the input screen in the corresponding area, for example. Further, based on the information on the style stored in the disabled-state information and applied to the identifiable display target area at the time of disabling the input item, a display mode of the corresponding area may be changed. This enables the user to associate the applied style. For example, the background of the corresponding area may be displayed in the same color as the set style, or an outlying area of the corresponding area may be surrounded in the same color as the set style. Further, the display based on the style set in the corresponding area may be constantly displayed regardless of the jump process. Thus, when the corresponding area is displayed prominently, the user can easily and visually recognize the corresponding area.

It is noted that if there are a plurality of input screens, and the identifiable display target area and the corresponding area are included in different input screens, respectively, the input screen including the corresponding area is displayed across the input screens.

Next, the controller 100 decides whether or not a return operation is performed, and if it is decided that the return operation is performed, the controller 100 displays the identifiably displayed area by the process of step S108 (step S288; Yes to step S290). This process allows the user to switch a content displayed on the display 150 from the screen where the corresponding area is displayed to the screen of the identifiably displayed area. At this time, the controller 100 may inquire of the user whether or not to display the screen of the identifiably displayed area on the display 150.

An example of the return operation includes an operation of changing the input value input in the input element included in the corresponding area. Specifically, if the input element included in the corresponding area is a drop-down list, a radio button, or the like, the return operation is an operation of selecting a value. If the input element is a check box, the return operation is a checking or unchecking operation. If the input element is a text box, the return operation is an operation of editing the input value. If the input value is changed, the identifiably displayed area is displayed.

It is noted that the return operation may be an operation of selecting a word indicating the area name or an operation of selecting a background portion of the corresponding area. Further, the return operation may be an operation of storing the input value (finalizing the input value) of the input element included in the corresponding area.

In addition, depending on the value input to the input element arranged in the corresponding area, the input element included in the identifiable display target area may remain disabled. Therefore, in step S288, if the input element included in the identifiable display target area is enabled and the return operation is performed, the controller 100 may display the identifiably displayed area, on the display 150.

2. 2 Operation Example

Figure 15A:
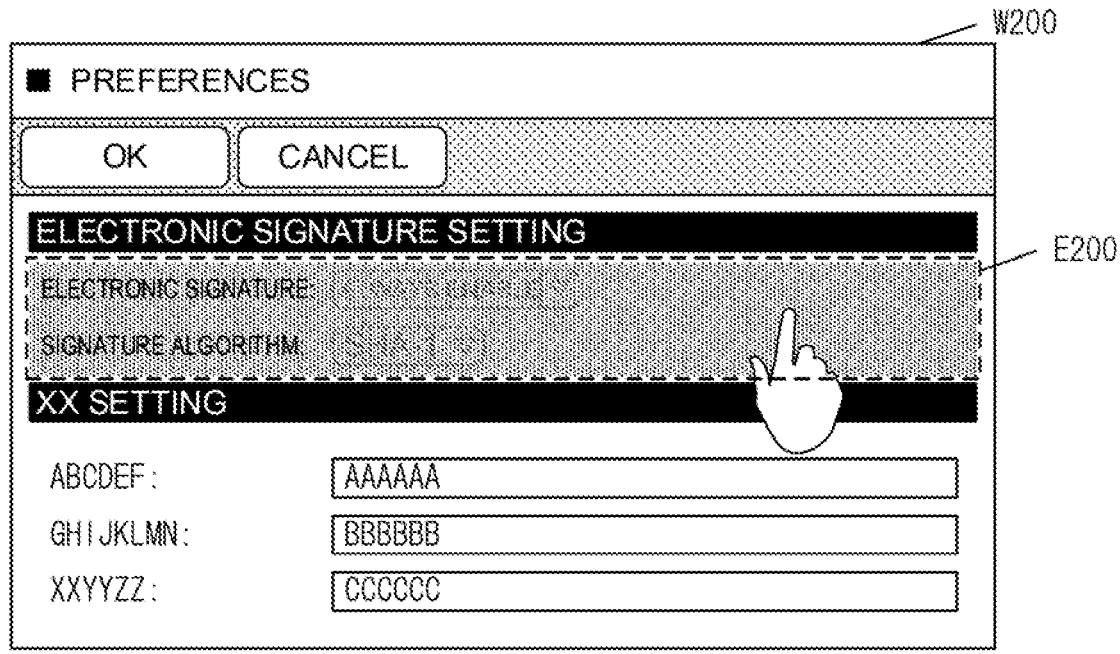
FIG. 15A and FIG. 15B are diagrams each illustrating an example of an operation according to the second embodiment.
Figure 15B:
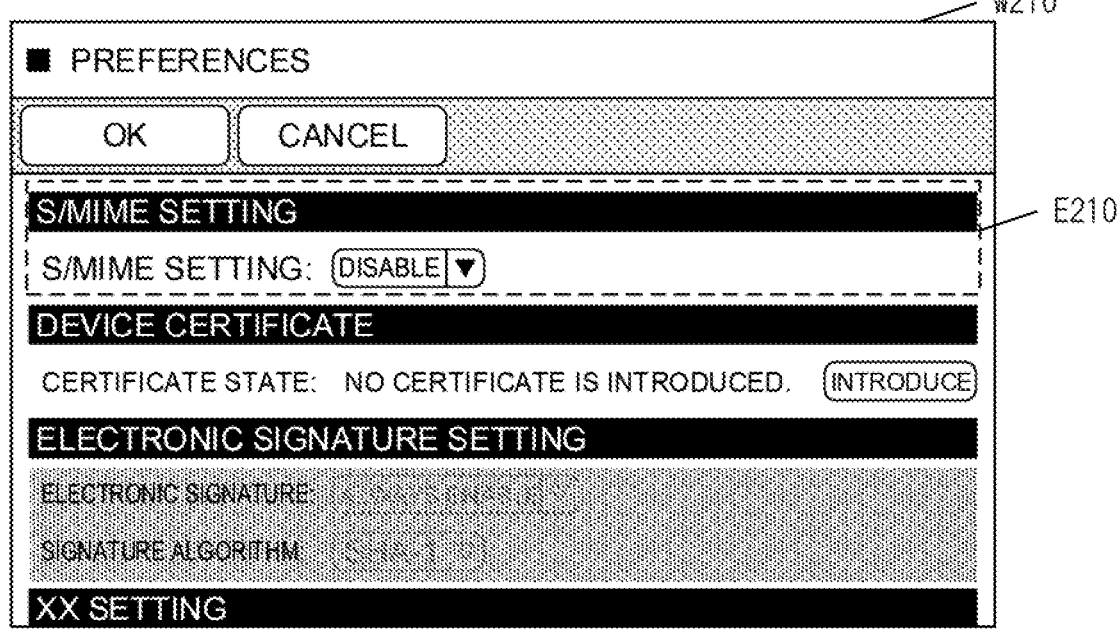

With reference to the drawings, an operation example of the present embodiment will be described. FIG. 15A and FIG. 15B illustrate examples of a screen displayed on the display 150 if the corresponding area is displayed on the display 150 as a result of the identifiable display target area being selected by the user. FIG. 15A is a screen example of an input screen W200 including an identifiable display target area E200 on the display 150. The identifiable display target area E200 is identifiably displayed in the corresponding color of the corresponding area.

FIG. 15B is a screen example of the input screen W210 including a corresponding area E210 displayed on the display 150 as a result of the identifiable display target area E200 being selected by the user. Thus, when selecting the identifiable display target area, the user can easily display the corresponding area including the input element causing the disabled state on the display 150. This can eliminate a need of the user to search for and display the input element causing the disabled state.

Figure 16A:
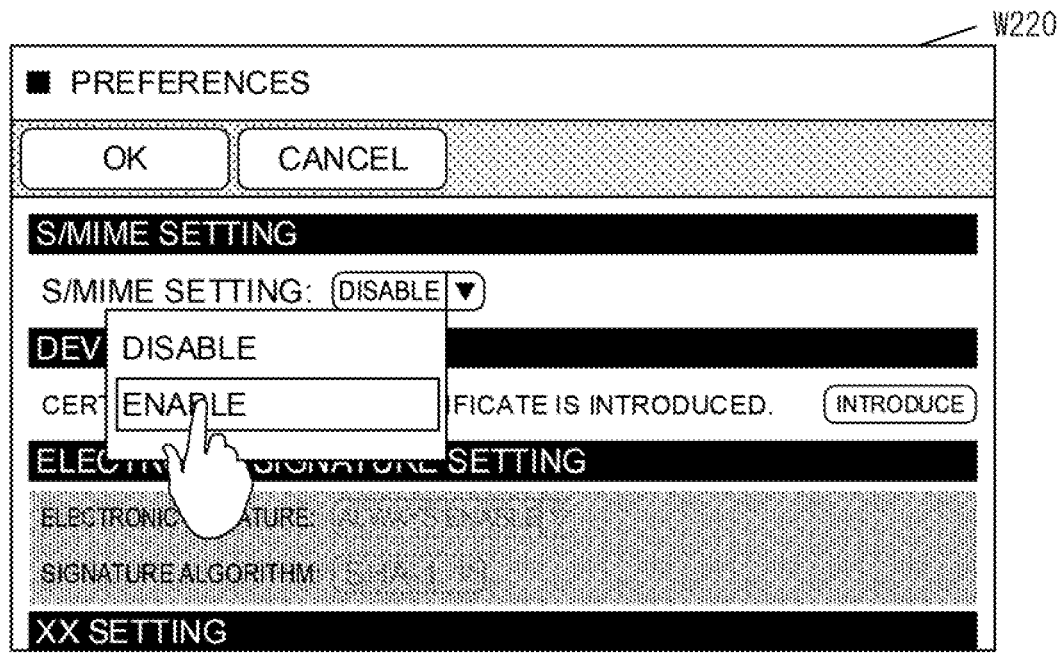
FIG. 16A and FIG. 16B are diagrams each illustrating an example of an operation according to the second embodiment.

FIG. 16A is an example of an input screen W220 obtained when the input value of the input element included in the corresponding area is changed by the user. Next, in response to the input value being changed, the image forming apparatus 10 displays the identifiably displayed area on the display 150. At this time, the image forming apparatus 10 may display an input screen W230 including a confirmation message area E230 on the display 150 as illustrated in FIG. 16B.

Figure 16B:
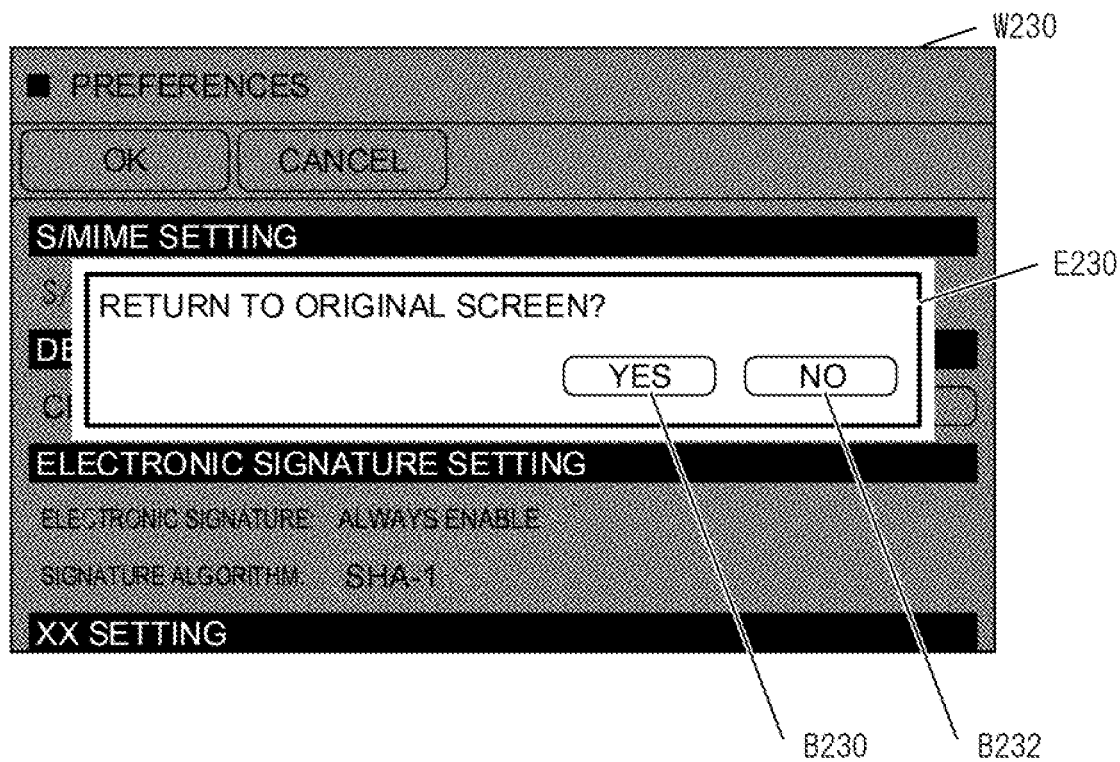

In the confirmation message area E230, a message for inquiring whether or not to display the identifiably displayed area is displayed (in an example of FIG. 16B, "return to the original screen?"). In response to the message, if a Yes button B230 is selected by the user, the image forming apparatus 10 displays the identifiably displayed area on the display 150. If a No button B232 is selected by the user, the image forming apparatus 10 hides the confirmation message area E230 without displaying the identifiably displayed area on the display 150.

It is noted that if there are a plurality of corresponding areas, the image forming apparatus 10 may display a pop-up screen displaying the corresponding areas in a list format and provides an opportunity for the user to select a corresponding area to be displayed, or may display one corresponding area according to a position selected by the user. If the corresponding area is displayed according to the position, for example, when the corresponding color is identifiably displayed by gradation, the image forming apparatus 10 displays the corresponding area corresponding to the corresponding color substantially the same as the color of the position selected by the user. If an icon is displayed as the identifiable display, the image forming apparatus 10 displays the corresponding area corresponding to the icon selected by the user.

According to the present embodiment, the user selects the identifiable display target area to transition to the screen of the corresponding area, and after inputting the input value to the input element arranged in the corresponding area, the user can return to the original screen. Therefore, it is possible to improve user convenience.

At this time, the cause of the disabled state can be notified to the user by noticeably displaying the corresponding area within the screen.

3. Third Embodiment

Figure 8:
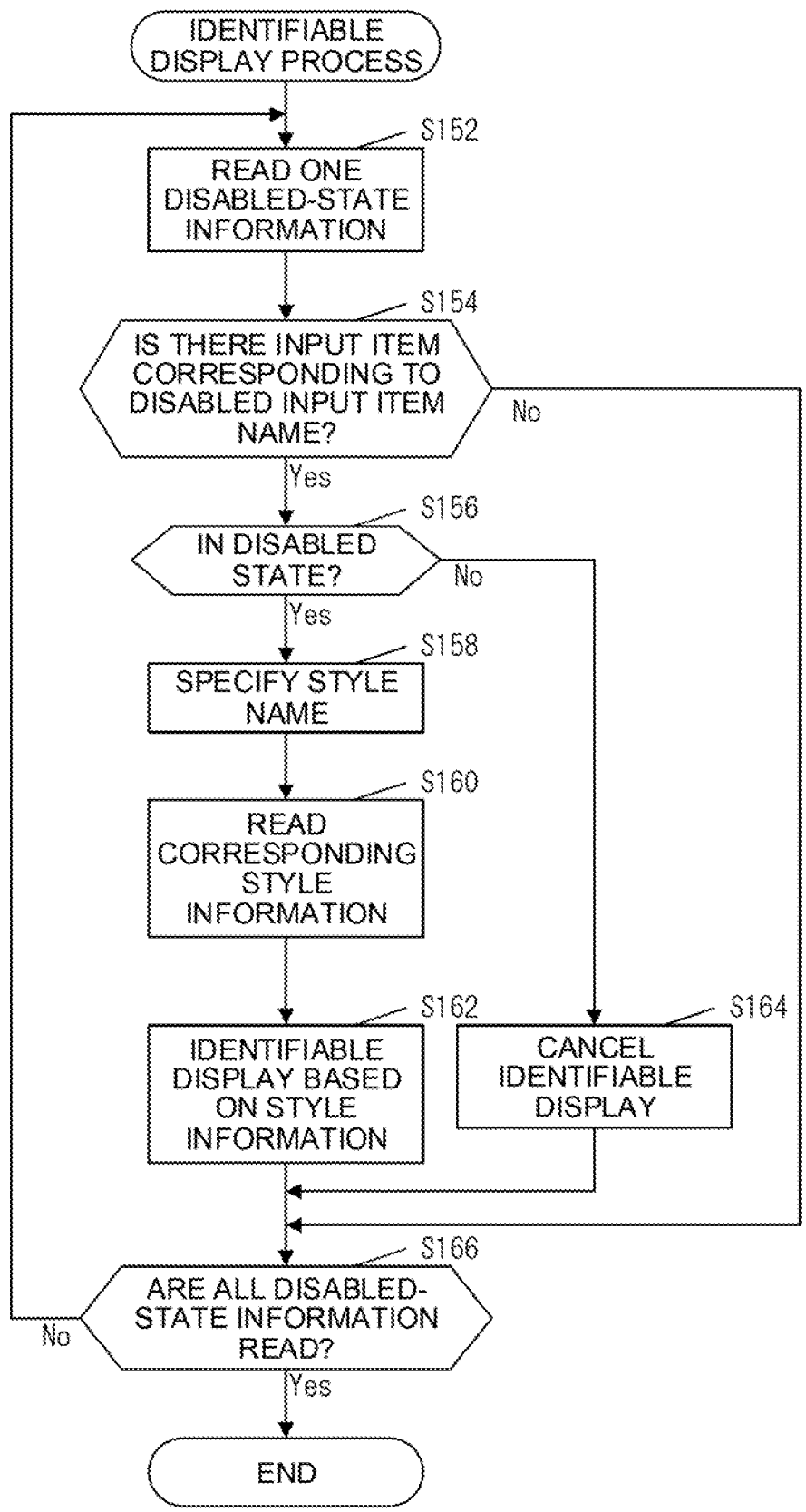
FIG. 8 is a flowchart for explaining an identifiable display process according to the first embodiment.
Figure 19:
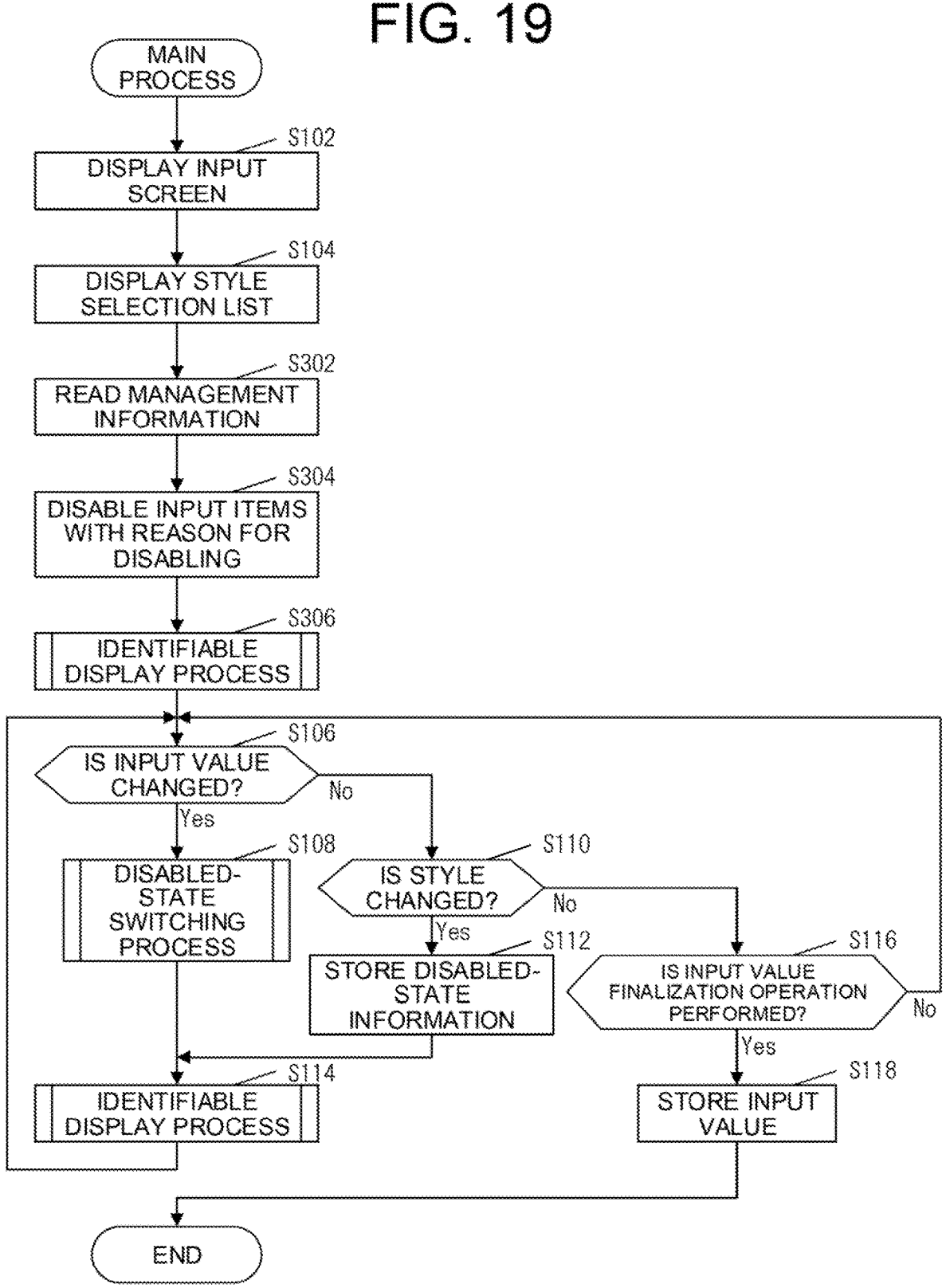
FIG. 19 is a flowchart for explaining a main process according to the third embodiment.

Next, a third embodiment will be described. The third embodiment is an embodiment where, in addition to the process in the first embodiment, a style is specified if an administrator or any other equivalent person of the image forming apparatus 10 does not allow the user to change the input value, or the input value cannot be changed due to the apparatus conditions. In the present embodiment, FIG. 2 of the first embodiment is replaced with FIG. 17, FIG. 6 is replaced with FIG. 19, and FIG. 8 is replaced with FIG. 20, respectively. It is noted that the same numeral or symbol is attached to the same functional unit and process, and the duplicated part is not described.

3. 1 Functional Configuration

A functional configuration of an image forming apparatus 12 in the present embodiment will be described with reference to FIG. 17. The image forming apparatus 12 is different from the image forming apparatus 10 in that a management information storage area 168 is further secured in the storage 160.

The management information storage area 168 is an area for storing management information that is information defining an input item of an input element to be disabled, a cause of the disabled state, and a display mode (style) of the identifiable display target area. The management information is information stored in advance not by the user of the image forming apparatus 12 but by the administrator or any other equivalent person of the image forming apparatus 12. FIG. 18 is a table showing management information in the present embodiment. As shown in FIG. 18, the management information stores a reason for a disabled state (for example, "not allow changes to setting due to security setting") that is a reason for disabling an input element, a disabled input item name (for example, "electronic signature setting") indicating an input element to be disabled, and a corresponding color (for example, "red") of an identifiable display target area.

The causes why an input element is disabled by the administrator or any other equivalent person are listed below.

(1) Input item whose input value is not changed due to security reasons

This is an input item for receiving an input value from an external management server so that the setting is not different for each image forming apparatus 12. In addition, this case includes a case where the administrator or the like wants to restrict a user's action from the viewpoint of security. An example of the case includes a case where output contents are temporarily saved after a print job is transmitted, and then the output contents are output after the user comes in front of the image forming apparatus 12. Such an input item is not allowed to be input/selected even by the administrator or any other equivalent person.

(2) Input item that cannot be input/selected due to apparatus conditions

This is an input item whose input value cannot be changed due to the condition of the image forming apparatus 12, such as paper feed option failure, staple needle shortage, sheet shortage, and an unusable discharge destination. In some cases, repairs are required, and a service person needs to be dispatched.

(3) Input item not to be input/selected due to administrative reasons

This is an input item whose input value cannot be changed based on the judgment of the administrator or any other equivalent person, such as not allowing for selection of full color or not allowing for selection of A3 sheet size. In such a case, it is not necessary for a service person to be dispatched, and the input item may be input or selected by an operation of an administrator or any other equivalent person.

The cause can be determined when a corresponding color is differentiated for each cause described above. For example, an input item whose input value is not changed due to security reasons is displayed in red, an input item that cannot be input/selected due to apparatus conditions is displayed in yellow, and an input item not to be input/selected due to administrative reasons is displayed in orange. This enables, for example, the administrator or any other equivalent person to explain that the setting cannot be changed due to security reasons when the user reports "the item is deactivated in red".

It is noted that another identifiable display may be performed depending on the importance of the cause. For example, if the input value cannot be changed due to the condition of the image forming apparatus 12 such as "paper feed option failure", the input element of the input item related to paper feed is disabled and the identifiable display in the corresponding color is performed. At this time, when all of the paper feed trays cannot be used, a prompt action (repair) is required, and thus, the identifiable display target area may be blinked.

If receiving a report from a user that "the item is deactivated, displayed in yellow, and is blinking", the administrator or any other equivalent person can decide that a service person should be sent as soon as possible. In addition, if receiving a report from the user that "the item is deactivated, displayed in yellow (, and is not blinking)", the administrator or any other equivalent person can ask the user to use another tray.

3. 2 Process Flow

With reference to FIG. 19, a flow of a main process of the image forming apparatus 12 will be described. After the input screen is displayed, and the style selection list is displayed (step S102 to step S104), the controller 100 reads management information stored in the management information storage area 168 (step S302). If the input screen includes an input item specified by the disabled input item name stored in the management information, that is, if the input screen includes an input item having a reason for a disabled state, the input item is disabled. (step S304).

Subsequently, the controller 100 performs an identifiable display process (step S306). In this way, the area including the input item disabled in step S304 can be identifiably displayed. It is noted that the input item identifiably displayed in steps S302 to S306 is an input item whose input value cannot be changed due to the administrator or the condition of the image forming apparatus 10.

A flow of the identifiable display process in the present embodiment will be described with reference to FIG. 20. The controller 100 reads one piece of management information from the management information storage area 168 (step S352). Then, the controller 100 decides whether or not the input item specified by the disabled input item name stored in the read management information is included in the input screen (step S354).

If the input item specified by the disabled input item name in the management information is included in the input screen, the controller 100 decides the area including the input item as an identifiable display target area, and identifiably displays the area in the corresponding color stored in the management information (step S354; Yes to step S356).

If all the management information are read, the controller 100 ends the identifiable display process (step S358; Yes). If there is still the unread management information, the process returns to step S352 (step S358; No to step S352).

Figure 20:
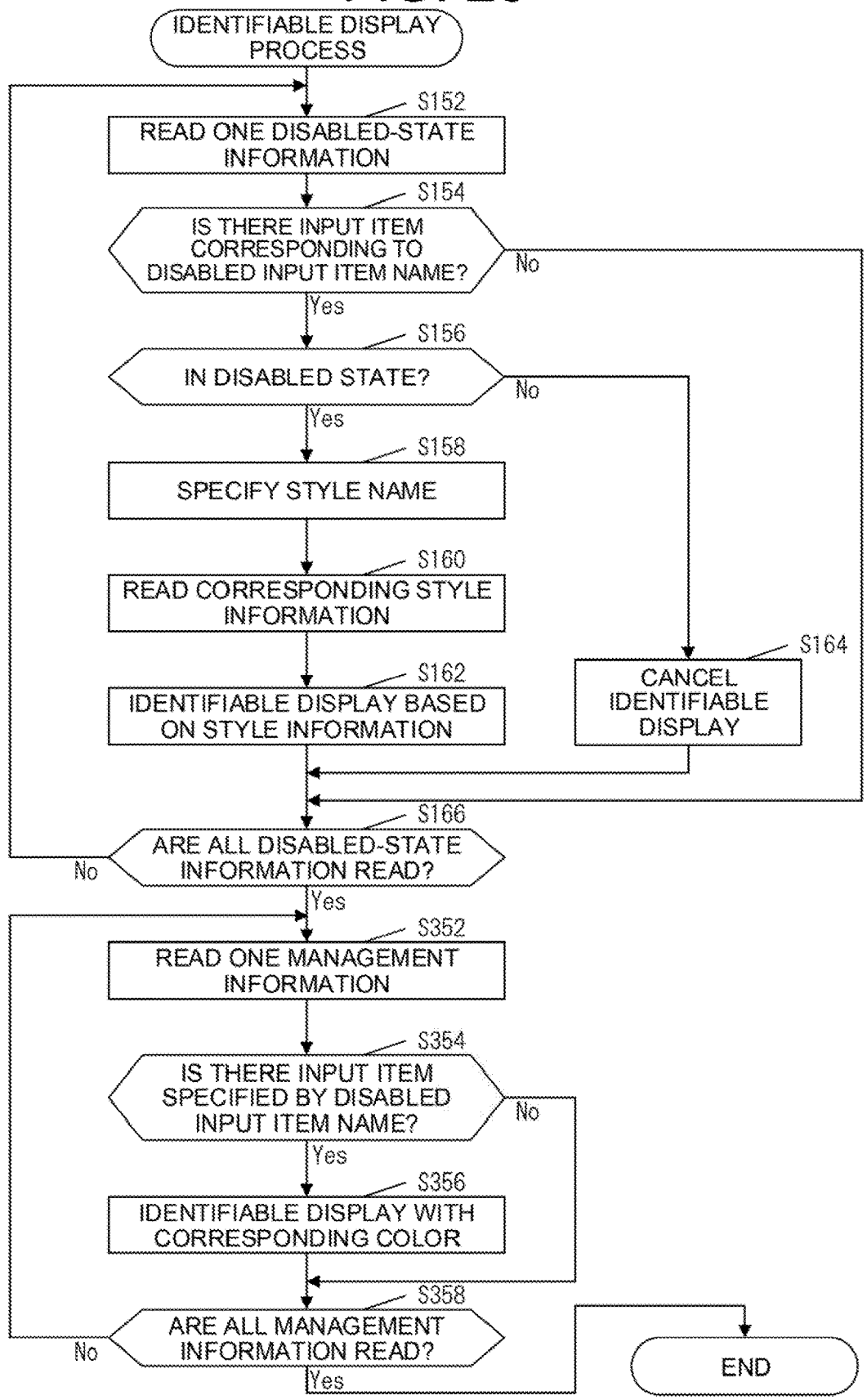
FIG. 20 is a flowchart for explaining an identifiable display process according to the third embodiment.

It is noted that the identifiable display process illustrated in FIG. 20 is also performed in step S114 of FIG. 19. At this time, identifiable display based on disabled-state information and identifiable display based on management information may be performed for a certain area. Here, a corresponding color stored in the disabled-state information is a first corresponding color, and a corresponding color stored in the management information is a second corresponding color. At this time, if only the first corresponding color is specified, the identifiable display target area is identifiably displayed in the first corresponding color. If only the second corresponding color is specified, the identifiable display target area is identifiably displayed in the second corresponding color. If the first corresponding color and the second corresponding color are specified, the identifiable display target area is identifiably displayed in the first corresponding color and the second corresponding color. As described in the description of the first embodiment, since there are a plurality of corresponding colors, the identifiable display target area may be identifiably displayed by gradation, or the area may be divided to identifiably display the divided areas in corresponding colors different from each other.

3. 3 Operation Example

Figure 21A:
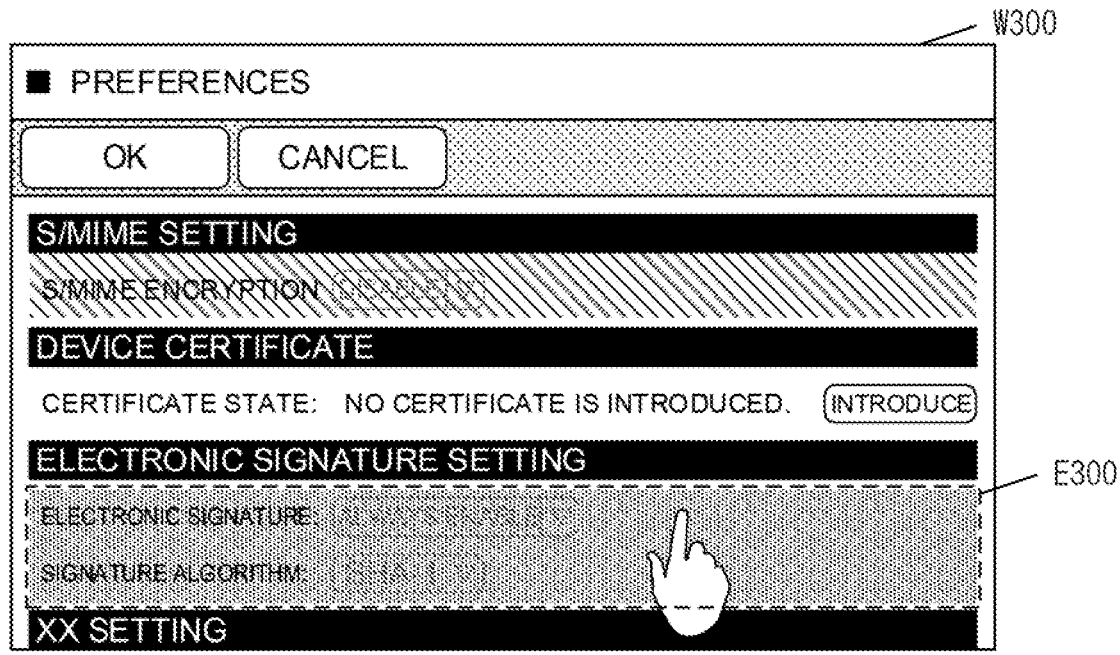
FIG. 21A and FIG. 21B are diagrams each illustrating an example of an operation according to the third embodiment.

Next, an operation example according to the present embodiment will be described. It is noted that in the following description, it is assumed that the information shown in FIG. 3 is stored in the input screen information storage area 162, the information shown in FIG. 4 is stored in the disabled-state information storage area 164, the information shown in FIG. 5 is stored in the style information storage area 166, and the information shown in FIG. 18 is stored in the management information storage area 168, respectively. First, FIG. 21A is a diagram in which the areas of "S/MIME setting" and "electronic signature setting" are identifiably displayed in a manner different from each other. Here, the input item "S/MIME encryption" included in "S/MIME setting" is disabled based on the management information including "S/MIME encryption" in the disabled input item name. An area including the input item "S/MIME encryption" is identifiably displayed based on the corresponding color stored in the management information.

On the other hand, the input items "electronic signature" and "signature algorithm" included in "electronic signature setting" are disabled since the input value of "S/MIME encryption" is "disable". The area including the input items "electronic signature" and "signature algorithm" is identifiably displayed based on the style information specified by the style name stored in the disabled-state information.

In this way, the areas including the disabled input item are identifiably displayed in a manner different from each other. Therefore, the user can understand that the causes of the disabled input items are different from each other.

Further, the image forming apparatus 10 may execute a jump process by combining the present embodiment and the second embodiment. A screen example in this case will be described with reference to FIG. 21. FIG. 21A illustrates an example of an input screen W300 obtained when the user selects an identifiable display target area E300.

At this time, the image forming apparatus 10 displays the corresponding area of the identifiable display target area E300 on the display 150. However, if the input item name of the input element included in the corresponding area matches the disabled input item name stored in the management information, the user cannot change the input value of the input element included in the corresponding area. Therefore, the user cannot enable the disabled input element included in the identifiable display target area E300 no matter what value is input for the input value of another input item.

Figure 21B:
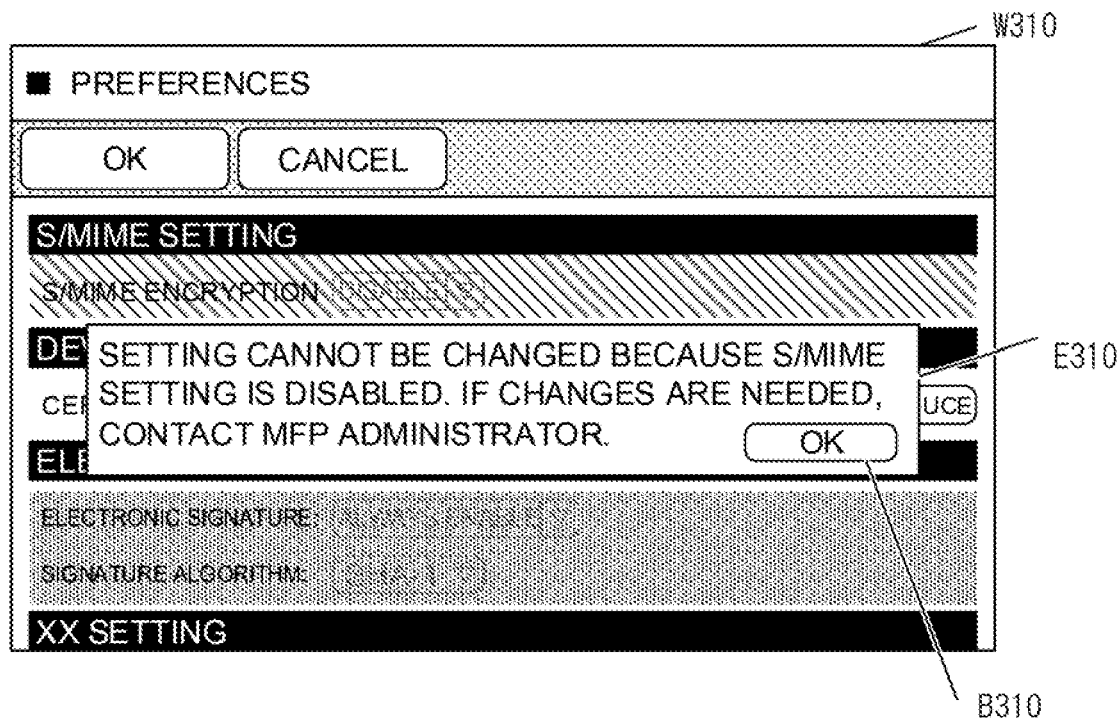

In such a case, the image forming apparatus 10 may display, on the display 150, an input screen W310 including a message area E310 as illustrated in FIG. 21B. In the message area E310, a message notifying that the disabled input element included in the identifiable display target area E300 cannot be enabled is displayed, indicating that the user is not authorized to change the input value. This enables the user to contact the administrator or any other equivalent person or to change the condition of the image forming apparatus 10.

According to the present embodiment, the user can decide whether the input item is an input item whose input value is intentionally prohibited from being changed by the administrator or any other equivalent person, or cannot be changed due to the apparatus conditions. In addition, the administrator or any other equivalent person can report the cause why the change of the input value is prohibited without checking the condition of the image forming apparatus 12 when being notified of the color used for the identifiable display by the user while being inquired from the user.

Further, if the cause is the condition and the like of the image forming apparatus 12, the image forming apparatus 12 can be repaired or released at that time, and it is not necessary to dispatch a service person more than necessary.

The user can specify a color other than the corresponding colors set by the administrator or any other equivalent person. Therefore, it is also easy for the user to determine the cause why the input element is disabled.

It is noted that, in the present embodiment, it has been described that the user and the administrator or any other equivalent person can specify the corresponding color of the identifiable display target area. However, only the administrator or any other equivalent person may be able to specify the corresponding color of the identifiable display target area.

4. Modification

The present invention is not limited to the above embodiments, and can have various modifications. That is, embodiments obtained by combining technical means appropriately changed within the scope not departing from the gist of the present invention are also included in the technical scope of the present invention.

Further, although the above-described embodiments have portions described separately for convenience of description, it is needless to say that the embodiments may be combined and executed within a technically possible range.

In addition, the program operating in each device in the embodiment is a program (a program that makes a computer function) that controls a CPU and the like to realize the functions of the above-described embodiments. Information processed by these devices is temporarily stored in a temporary storage device (such as a RAM) at the time of processing the information, and then stored in storage devices such as various Read Only Memories (ROMs) and HDD, and read, or corrected/written by the CPU as necessary.

Here, examples of a recording medium for storing the program can include a semiconductor medium (such as a ROM and a non-volatile memory card), an optical recording medium/magneto-optical recording medium (such as a Digital Versatile Disc (DVD), a Magneto Optical Disc (MO), a Mini Disc (MD), a Compact Disc (CD), and a Blu-ray Disc (BD) (registered trademark)), and a magnetic recording medium (such as magnetic tape and a flexible disk). In addition, when the loaded program is executed, not only the functions of the above-described embodiments are realized, but also based on the instructions of the program, the processing is performed in cooperation with an operating system or another application program so that the functions of the present invention may be realized.

In addition, when being distributed to the market, the program can be stored and distributed in a portable recording medium, or transferred to a server computer connected via a network such as the Internet. In this case, of course, a storage device of the server computer is also included in the present invention.

What is claimed is:

1. A display device, comprising:
    a display that displays an input screen having a plurality of areas arranged with an input element;
    determination circuitry that determines a cause of a disabled state if the input element is in the disabled state; and
    display controlling circuitry that performs control to identifiably display the plurality of areas arranged with the input element in the disabled state, in a color corresponding to the cause, wherein
    the display device further comprises a storage that stores colors corresponding to the plurality of areas, and
    if a cause of disabling an input element included in one area is based on a content input in an input element included in a different area, the display controlling circuitry performs control to display a whole of the one area in a color corresponding to the different area.

2. The display device according to claim 1, wherein the display controlling circuitry performs control to superimpose and display a color different from a background color of the display, in the plurality of areas.

3. The display device according to claim 1, wherein the display controlling circuitry performs control to display a color different from a background color of the display, in a background of the plurality of areas.

4. A non-transitory recording medium storing a program of a display device, the program causing a computer to execute:
    displaying an input screen having a plurality of areas arranged with an input element;
    storing colors corresponding to the plurality of areas;
    determining a cause of a disabled state if the input element is in the disabled state; and
    performing control to identifiably display a whole of one area of the plurality of areas arranged with the input element in the disabled state, in a color corresponding to a different area if a cause of disabling an input element included in the one area is based on a content input in an input element included in the different area.

5. A display method of a display device comprising:
    displaying an input screen having a plurality of areas arranged with an input element;
    storing colors corresponding to the plurality of areas;
    determining a cause of a disabled state if the input element is in the disabled state; and
    performing control to identifiably display a whole of one area of the plurality of areas arranged with the input element in the disabled state, in a color corresponding to a different area if a cause of disabling an input element included in the one area is based on a content input in an input element included in the different area.

* * * * *